United States Patent
Bunte et al.

(10) Patent No.: US 7,232,072 B1
(45) Date of Patent: Jun. 19, 2007

(54) COMBINED CODE READER AND DIGITAL CAMERA

(75) Inventors: Alan G. Bunte, Cedar Rapids, IA (US);
Arvin D. Danielson, Solon, IA (US);
Dennis A. Durbin, Cedar Rapids, IA (US); James D. Bennett, San Clemente, CA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/804,587

(22) Filed: Mar. 19, 2004

Related U.S. Application Data

(60) Division of application No. 10/701,199, filed on Nov. 4, 2003, which is a continuation of application No. 09/961,697, filed on Sep. 24, 2001, now Pat. No. 6,641,046, which is a continuation of application No. 09/170,689, filed on Oct. 13, 1998, now Pat. No. 6,330,975, which is a continuation of application No. 08/703,564, filed on Aug. 27, 1996, now Pat. No. 5,821,523, which is a continuation-in-part of application No. 08/461,605, filed on Jun. 5, 1995, now Pat. No. 5,902,988, which is a continuation of application No. 08/277,132, filed on Jul. 19, 1994, now abandoned, which is a continuation of application No. 07/919,488, filed on Jul. 27, 1992, now abandoned, which is a continuation-in-part of application No. 07/489,771, filed on Mar. 12, 1992, now abandoned, and a continuation-in-part of application No. 07/889,705, filed on May 26, 1992, now abandoned, which is a continuation-in-part of application No. 07/849,771, filed on Mar. 12, 1992, now abandoned.

(51) Int. Cl.
*G06K 9/22* (2006.01)

(52) U.S. Cl. ............. 235/462.45; 235/454; 235/472.01

(58) Field of Classification Search ........... 235/462.01, 235/472.01, 462.06, 462.09, 462.15, 462.45, 235/462.41, 454; 396/207, 210; 348/96, 348/98, 195
See application file for complete search history.

(56) References Cited

U.S. PATENT DOCUMENTS

| | | | | |
|---|---|---|---|---|
| 4,853,733 A | * | 8/1989 | Watanabe et al. | 396/300 |
| 4,983,996 A | * | 1/1991 | Kinoshita | 396/312 |
| 5,192,856 A | * | 3/1993 | Schaham | 235/462.24 |
| 5,343,267 A | * | 8/1994 | Kazumi | 396/300 |
| 5,381,207 A | * | 1/1995 | Kazumi | 396/57 |
| 5,902,988 A | * | 5/1999 | Durbin | 235/472.01 |
| 5,979,764 A | * | 11/1999 | Swyst et al. | 235/462.2 |
| 6,040,856 A | * | 3/2000 | Sakaegi | 348/231.6 |
| 6,594,503 B1 | * | 7/2003 | Herzig et al. | 455/550.1 |

* cited by examiner

*Primary Examiner*—Ahshik Kim
(74) *Attorney, Agent, or Firm*—Michael F. Williams; Simmons, Perrine, Albright & Ellwood

(57) ABSTRACT

An image capture system having an image capture module and a terminal unit captures both photo images and coded images. An alterable optical path of the system operates in a first configuration when capturing coded images and in a second configuration when capturing photo images. Captured images are presented on a display as they are captured. A user of the system may parse through captured images to select one or more of the captured images for permanent storage and/or transmission to a remote location. The system operates to identify coded targets within captured images, to prompt the user to select one or more of the identified coded targets and to decode the selected coded targets. The image capture system may direct a user to reposition the system so that a decodable coded image will be captured. The image capture system communicates over wireless and wired networks with remote computer systems, personnel, and mobile units.

30 Claims, 23 Drawing Sheets

COMBINED CODE READER AND DIGITAL CAMERA

CROSS REFERENCE TO RELATED APPLICATIONS

The present application is a continuation of U.S. application Ser. No. 10/701,199 filed Nov. 4, 2003, which is a continuation of U.S. application Ser. No. 09/961,697 filed Sep. 24, 2001, now U.S. Pat. No. 6,641,046, which is a continuation of U.S. application Ser. No. 09/170,689 filed Oct. 13, 1998, now U.S. Pat. No. 6,330,975, which is a continuation of application Ser. No. 08/703,564 filed Aug. 27, 1996, now U.S. Pat. No. 5,821,523, which is a continuation-in-part of application Ser. No. 08/461,605 filed Jun. 5, 1995, now U.S. Pat. No. 5,902,988, which is a continuation of U.S. application Ser. No. 08/277,132 filed Jul. 19, 1994, now abandoned, which is itself a continuation of U.S. application Ser. No. 07/919,488 filed Jul. 27, 1992, now abandoned, which is a continuation-in-part of two applications: (1) U.S. application Ser. No. 07/849,771 filed Mar. 12, 1992, now abandoned; and (2) U.S. application Ser. No. 07/889,705 filed May 26, 1992, now abandoned. The U.S. application Ser. No. 07/889,705 is a continuation-in-part of application Ser. No. 07/849,771. Application Ser. No. 08/284,883 filed Jul. 28, 1994, now U.S. Pat. No. 5,414,251 is a continuation of the application Ser. No. 07/849,771.

INCORPORATION BY REFERENCE

All of the patent applications filed on or before Jun. 5, 1995, which are relied upon in the previous section entitled "Cross Reference to Related Applications" including said application Ser. No. 08/461,605 which is now U.S. Pat. No. 5,902,988, are hereby incorporated herein by reference in their entirety including original claims and incorporated material.

BACKGROUND

1. Technical Field

This invention relates generally to digital photography and coded image reading. More particularly, the present invention relates to a modular image capture and processing system capable of capturing both photo and coded images. The system employs a common photo-detector, image processor and interface circuitry to capture and process the photo and coded images. The present invention further relates to a system for capturing a plurality of images, both photo images and coded images, displaying the plurality of captured images as directed by a user, for selectively processing the images to detect codes and for allowing a user to select one or more of the images for transfer or decoding.

2. Description of Related Art

The use of electronic equipment to capture images in a digital format is well known in the art. Digital cameras capture images and store the captured images in an electronic format for future use. Coded image capture and decoding systems capture coded images, may comprise one or two dimensional coded images, and decode the captured coded images to reveal information contained within the coded images.

Digital cameras and coded image capture and decoding systems typically each include a processing unit, memory, a user interface and at least one data link. Both coded image capture and decoding systems and digital cameras employ photo-detectors to convert focused visual images into electronic representations of the images ("captured images"). A photo-detector may comprise a single photo-sensitive element such as those used in laser scanning systems or may comprise an array of photo-sensitive elements such as charge coupled device (CCD) elements. In a typical image capture device having a CCD array, the cost of the CCD array alone typically exceeds the cost of all other components combined.

Captured image capture requirements for photo images differ significantly from those of coded images. Image framing, focus and exposure requirements in the capture of photo images depends only on a subjective evaluation by a user made after a photo image has been captured. For coded image capture, however, a captured coded image is only considered satisfactory if it can be decoded. For example, a photo image of a distant mountain having insufficient resolution to reveal a small stone at the peak often proves satisfactory to a user. However a distant coded image must be resolvable to prove satisfactory.

Conventional digital cameras capture photo images at the initiation of a user. Typical digital cameras respond to the depression of a button by immediately capturing a single photo image. At some time thereafter (often days later), the user views the results, identifying defects in the captured photo images. Such defects may arise from: 1) a user's improper operation of the digital camera; 2) jitter introduced by the user due to human stability limitations; 3) shaking caused during the depression of the button; 4) movement of the object being photographed; or 5) digital camera limitations. No matter what the source of a defect, the user must reattempt the entire process of attempting to capture an acceptable image. In many situations, such reattempts are undesirable, if not impossible, to perform because defects are not detected until the opportunity has passed.

Upon initiation of a user, conventional coded image capture and decoding systems repeatedly capture and attempt to decode coded images until an attempt proves successful. Typically, a user directs a coded image capture and decode device at a target containing a coded image, depress a capture and decode button and hold the button until a successful decode occurs. Because decoding is performed on each captured coded image regardless of its quality, decode processing is often performed on poor quality captured coded images and non-coded images. Such futile processing wastes power which, in portable coded image capture and decoding system, detrimentally shortens battery life.

The use of service, installation and delivery personnel to conduct business at customer sites is also well known. Such personnel typically travel to a customer's site to install, repair or deliver goods or to perform other services. The retrieval of information from customers' sites relating to site characteristics is often required and performed by the personnel that travel to the customer. For example, a bakery may desire to know the size and location of shelf space which has been allocated to it at each of the retail locations that distributes its goods. The bakery may also desire pricing and shelf spacing information regarding its competitors at such the retail locations. This information may be later used to present, distribute and price produces in the locations. Conventional approaches require that the bakery's delivery personnel manually collect the information and deliver the information to the bakery for correlation and review. Similarly, in another example, service personnel may visit a customer's site and, upon analysis of the service to be performed, may need advice or information regarding how to proceed. Often times, to get such advice, one or more trips by such service personnel between a service center and the customer's site is performed to enable the carrying out of the services.

Because of the additional reporting and information gathering responsibilities, many personnel carelessly perform information gathering and retrieval tasks, often making mistakes. Others falsify information to save time, by either not having to gather the information while at a site or not even having to visit the site at all. Such carelessness and falsification occurs because both the manual gathering and delivery of such information is time-consuming and the carelessness and falsification cannot easily be detected.

Thus, there is a need in the art for a system that captures images, decodes images when appropriate, transmits images when appropriate and otherwise performs processing functions as required to retrieve and process information.

SUMMARY OF THE INVENTION

The aforementioned problems found in the art are overcome in an image capture system of the present invention which includes a photo-detector array, an alterable optical path, and a controller. The system may also include a display, a user interface, and a wireless communication link. The photo-detector, the alterable optical path, and controller are contained within a module that is connectable to a terminal or host unit. Alternatively, the terminal unit may include the display and the user interface along with a terminal processor. Other configurations are also possible.

During operation, the system periodically operates the photo-detector to capture images based upon reflected light from an illuminated object that has been focused upon the photo-detector by the alterable optical path. The controller then retrieves the captured image from the photo-detector, processes the image as required and forwards the image to the display for viewing. The periodic capture and display process occurs, for example, every second. By issuing commands, a user of the system may store an image for semi-permanent or permanent retention. This image may be retained locally in a buffer or memory or may be transmitted over a wired or wireless data link to a central location.

The image capture system may be used as a digital camera, a coded image capture and decoding system and/or as a real-time video system. Circuitry within the terminal processor or controller may be programmed to seek coded targets within a captured image, notify the user of the detection of the detected coded targets, and allow the user to select one or more of the coded targets within a captured image. The system then decodes the selected coded targets to produce information pertinent to the user of the image capture system. The system may also direct a user to reposition the system with respect to a target so that a decodable image will be captured.

The circuitry of the image capture system may be controlled to transmit images to a central location over a wired or wireless link as they are captured or retained. The images may then be permanently stored and referenced at the central location. Information relating to the images may then be received by the system and relayed to the user. Transmitted coded images may also be decoded at the central location after transfer by higher powered processing equipment. A series of captured and transmitted images may comprise a real-time video transmission.

DETAILED DESCRIPTION OF THE DRAWINGS

Figure 1:
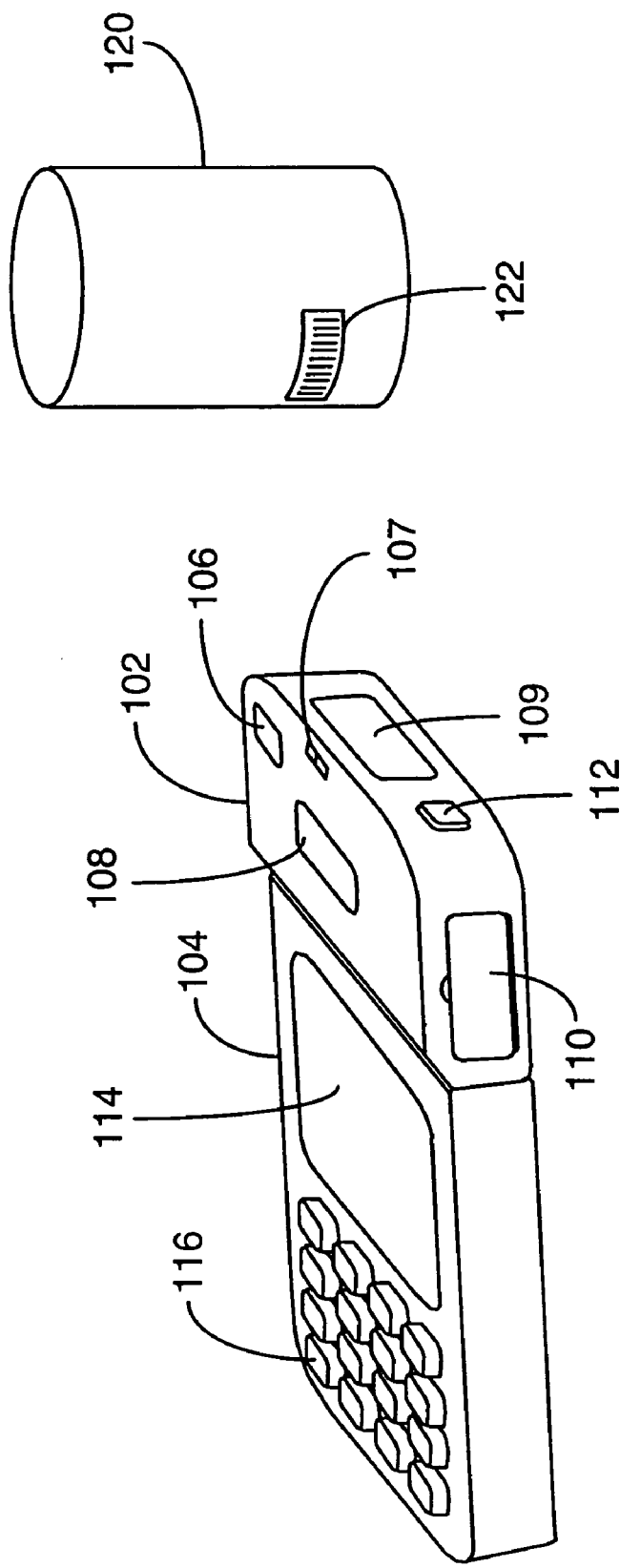
FIG. 1 is a perspective view of an image capture system of the present invention shown operating in a horizontal orientation to capture and decode a coded image.
Figure 2:
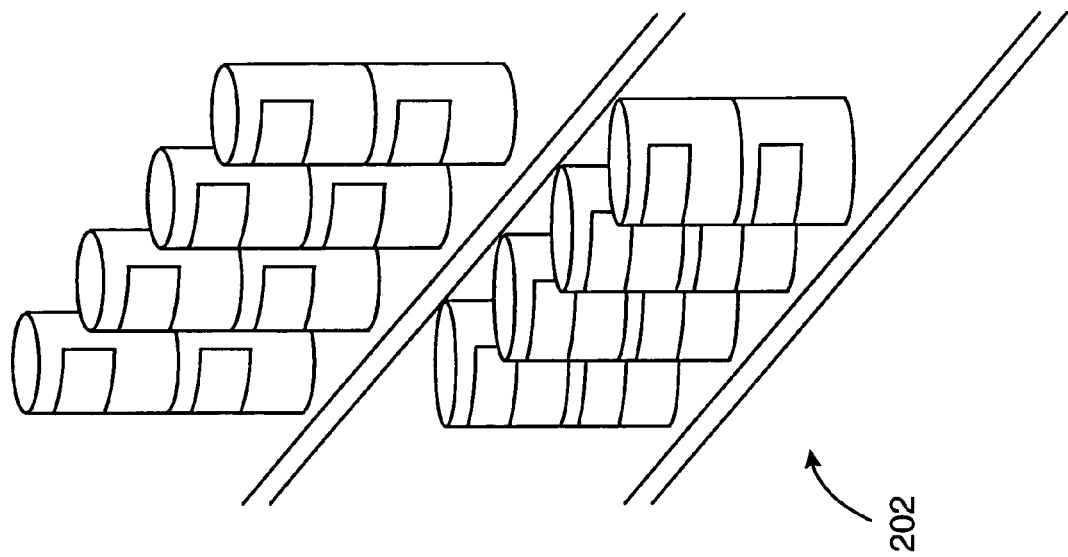
FIG. 2 is a perspective view illustrating the image capture system FIG. 1 operating in a vertical orientation to capture a photo image.
Figure 2:
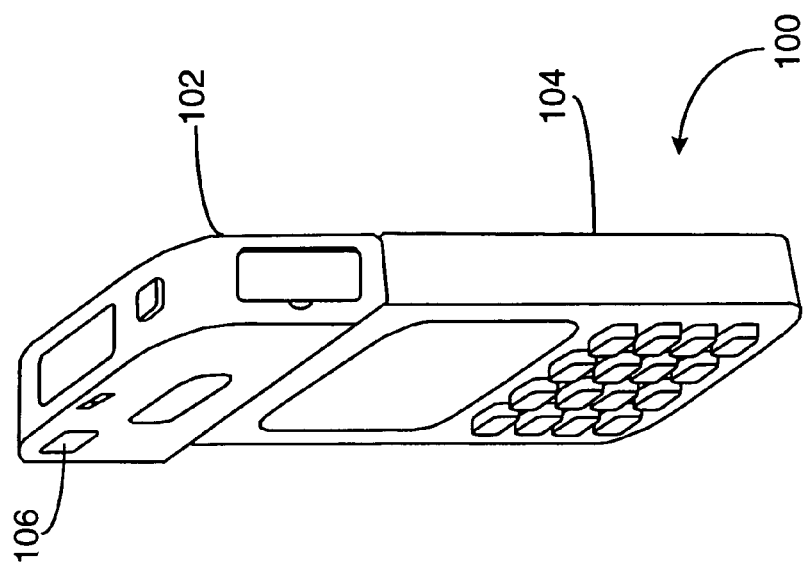

FIGS. 1 and 2 illustrate an image capture system 100 of the present invention having an image capture module 102 and a terminal unit 104 (alternatively host unit) that is capable of capturing both photo images and coded images. Because the optical requirements for capturing satisfactory photo images differ from those for capturing satisfactory coded images, the system 100 includes an alterable optical path that focuses reflected onto a common photo detector in different manners depending upon use. FIG. 1 illustrates operation of the system 100 in a horizontal orientation when capturing coded images while FIG. 2 illustrates operation of the system in a vertical orientation while capturing photo images. In the embodiment illustrated in FIGS. 1 and 2, the properties of the optical path in the horizontal orientation differ from the optical properties of the optical path in the vertical orientation. The image capture system 100 employs a common photo detector to capture images in both the horizontal orientation and the vertical orientation.

The terminal unit 104 provides a display 114, user interface 116 and additional processing capability. The display 114 allows a user to preview captured images prior to, during and immediately after capture of the images. Thus, the display 114 aids a user in aligning the image capture module 102 and adjusting its operation to capture satisfactory images. While a viewfinder 106 allows a user to align the module 102 when in the vertical orientation the display 114 provides a mechanism for aligning the module 102 when operating both in the vertical orientation and the horizontal orientation. In embodiments of the system that do not incorporate viewfinders, images displayed upon the display 114 provide the only visual indicia for system alignment and adjustment.

In operation, the system 100 may temporarily retain and display a series of captured images. Upon review of the images on the display 114, a user may decide to have the system permanently retain all or a portion of the images, have the system decode one or more of the images or have the system discard the images. The images may be permanently retained in memory in the terminal unit 104 or may be transmitted to a remote location for storage and subsequent review.

The image capture module 102 may operate either when connected to the terminal unit 104 or when separated from the terminal unit. A connector interface between the image capture module 102 and the terminal unit 104 provides bi-directional communication and control and may comprise, for example, a wired parallel or serial interface, or a wireless RF (radio frequency) or infrared interface. When using a wireless interface, the image capture module 102 interfaces with the terminal unit 104 without requiring a physical connection thereto. Alternatively, the image capture module may be incorporated within the housing of the terminal unit 104, as discussed further detail below.

The system 100 captures, displays images for review, stores images, transfers images and decodes images as directed by a user. Each of these functions may be independently controlled for the particular operational undertaking. The functions and operations of the system 100 may be categorized according to capture, display, storage, transfer and decoding. Thus, operations of the system will be discussed along these categories.

The system 100 captures images in various fashions depending upon user input and consistent with particular applications. In the case of the capture of photo images. the module 102 performs a capture cycle responsive to the depression of a capture button. A capture cycle may comprise capturing a single image, a series of images until the capture button is released, or the capture of a pre-determined number of images. The pre-determined number of images may be a defined number or may correspond to the available image storage capacity of the system 100. A duration between the capture of subsequent images may be established by a user or may be dependent upon the limitations of the system 100 itself, such as the minimum set-up time of the module 102 for capturing images.

In a single image capture mode, a user initiates a capture cycle by depressing a capture button causing the system 100 to capture and buffer a single image. The image is then displayed and the user determines whether to temporarily or permanently retain the image or to capture another image for consideration by providing corresponding input. This operation may be easily employed when a viewfinder 106 serves as a primary means for aligning the system 100. However, when a viewfinder is not available, such as in the horizontal orientation of FIG. 1, the mode would be less useful.

In a modified single image capture mode of operation, single images are captured and buffered at regular intervals. When captured, each image is displayed for review by a user. The user may determine to temporarily or permanently retain the image after viewing by providing proper input or may choose to discard the image by providing no input or providing a discard input to the device. The capture cycle is repeated at regular intervals so that the capture cycle serves to allow the user to frame a subject correctly and to adjust the system 100 as required to capture a desired image. For example, an image displayed that shows only the left half of the code 122 indicates to the user that the system 100 needs to be aligned to the right. An image showing an undersized code 122 indicates to the user to move the system 100 closer to the object 120. This mode works particularly well when the system 100 operates without a viewfinder wherein the display provides the only framing guide.

In a multi-image capture mode of operation, a plurality of images are captured and buffered during each capture cycle. An image buffer within the image capture module 102 provides temporary storage for a fixed number of captured images, perhaps "N" images. Upon capture of the N images, the N images are written into the buffer in a first-in-first-out (FIFO) fashion. When the buffer is filled, an indication is given to the terminal unit 104 or to the control circuitry of the image capture module 102. In one embodiment, the capture of images ceases when the buffer is full. However, in another embodiment, if the number of captured images overruns the storage capability of the image buffer, older images are overwritten by newer images.

After capture of a single image or a series of images, the terminal unit 104 allows the user to review the images, parse the images and select one or more of the images for permanent storage. Keypad interface 116 on the terminal unit 104 allows a unit to control the display of the images on the display 114. Upon review, the user may decide to permanently retain all, a portion of, or none of the images that were captured and temporarily retained. Permanently retaining images entails moving the selected images from the image buffer to semi-permanent storage in the terminal unit 104.

Permanent storage may also comprise storage at a location remote from the system 100. Thus, the system also includes a communication link to a remote location capable of being used to transfer images to the remote location. When initiated by a user, the system 100 transfers selected images to the location. The system 100 may receive feedback from the remote location relating to the captured images and to the capture of subsequent images. A wired or wireless link preferably links the system 100 to the remote location and facilitates the data transfers as required.

The system 100 may also decode captured coded images or otherwise operate to facilitate the decoding of coded images. In one mode of operation, the system 100 performs a full decode of the captured coded image. In another mode, the system 100 provides feedback to the user indicating the quality of the captured coded image prior to an attempted decode operation. The system 100 may also direct the user to alter a position or orientation of the system 100 with respect to an object 120 upon which a coded image 122 resides and/or to alter the optical properties of the system to capture a satisfactory image. Further, when directed, the system 100 parses captured images searching for coded targets and identifying coded targets when found. The system 100 then allows the user to select a coded target on the display 14 using the keypad 116 or another interface when more than one coded target is found. The system 100 may also transmit the coded image to a remote location for decoding should the decoding requirements be great, such as the case with two-dimensional coded images.

In another embodiment of the present invention, the system 100 prompts the user to correctly position the image capture module 102 or system 100 correctly with respect to a coded image 122 to enable a capture and decoding of the coded image 122. With the system 100 correctly positioned, the system 100 prompts the user to capture a coded image and to decode the coded image. Thus, the system 100 of the present invention provides the important benefit of only executing a decode cycle upon the capture of a sufficient coded image. By prompting for the capture and decoding only when a satisfactory capture is possible, the present invention facilitates efficient operation and reduced energy usage.

With the system 100 in the horizontal orientation as illustrated in FIG. 1, the image capture module 102 receives light reflected from a bar code 122 through a capture window 109 located on an end portion of the module 102. An optical path of the module 102 focuses the light onto a photo-detector array located within the module 102. The photo-detector array converts the light reflected from the bar code 122 into a captured image which is then processed and displayed on the display 114. Components of the system 100 executing these functions will be further described hereinafter.

Illumination reflector unit release button 107 operates to extend an illumination reflector unit to an extended position as compared to a retracted position. Battery door 110 opens to allow the image capture module 102 to receive a battery that powers its operation. Thus, the module 102 does not require power from the terminal unit 104. However, in other embodiments, the module 102 could receive primary or back up power from the terminal unit 104.

FIG. 2 illustrates operation of the image capture system 100 in a vertical orientation to capture a photo image. The requirements for capturing a decodable coded image are quite different than those required for capturing a photo image. For example, lensing system requirements for capturing photo images differ significantly from those required for capturing coded images. Thus, to minimize cost, the illustrated embodiment of the system 100 of the present invention includes a first optical path and a second optical path. One of the optical paths operates during the capture of coded images while the other optical path operates during the capture of photo images. Reflected images passing through each of the paths are captured by a common photo-detector and processed with common image processing circuitry. In the embodiment shown, a vertical orientation of the module 102 (as shown in FIG. 2) operates to capture photo images while a horizontal orientation of the module 102 (as shown in FIG. 1) operates to capture coded images. However, in other embodiments, the system could operate in a vertical orientation to capture coded images and in a horizontal orientation to capture photo images. Further, in still other embodiments, a single optical path could be provided with adjustable optics fixable in a first configuration to capture photo images and in a second configuration to capture coded images.

FIG. 2 illustrates the image capture system 100 capturing a photo image of a shelf space. As illustrated, the viewfinder 106 serves to provide guidance in aligning the system to capture an image of a shelf space. However, while the viewfinder provides for primary alignment, the display provides a final guide in determining whether to permanently capture an image of the shelf space 202. Because the illustrated application would include the transmission of images to a central location for further use at the central location, review of the captured image is required prior to its transmission. Thus, a typical sequence of events in this application would include, first attempting to capture a satisfactory image of the shelf space using the viewfinder. If, as evidenced by the captured image on the display, the image is satisfactory, the user initiates transfer of the captured image to a central location. This transfer could occur immediately after capture of the image via a wireless connection ("real-time" communication), by modem over a telephone line when a line becomes available ("batch" communication) or by another data connection. However, if the captured image is not satisfactory, as evidenced by the captured image on the display, the user initiates another image capture. This process is repeated until a satisfactory image is captured and transferred to a central location. After image capture is complete, the central location may communicate back to the system 100 instructing the user to rearrange or reorganize the shelf space 202. The system 100 therefore provides a mechanism for easily collecting information, quickly relaying the collected information, and receiving returned information. Users of the system at the central location provide feedback to the actual user of the system 100 via the video display to direct the user. Communication between the user of the system 100 and the central location may be achieved over the combination of wireless and wired links.

Figure 3:
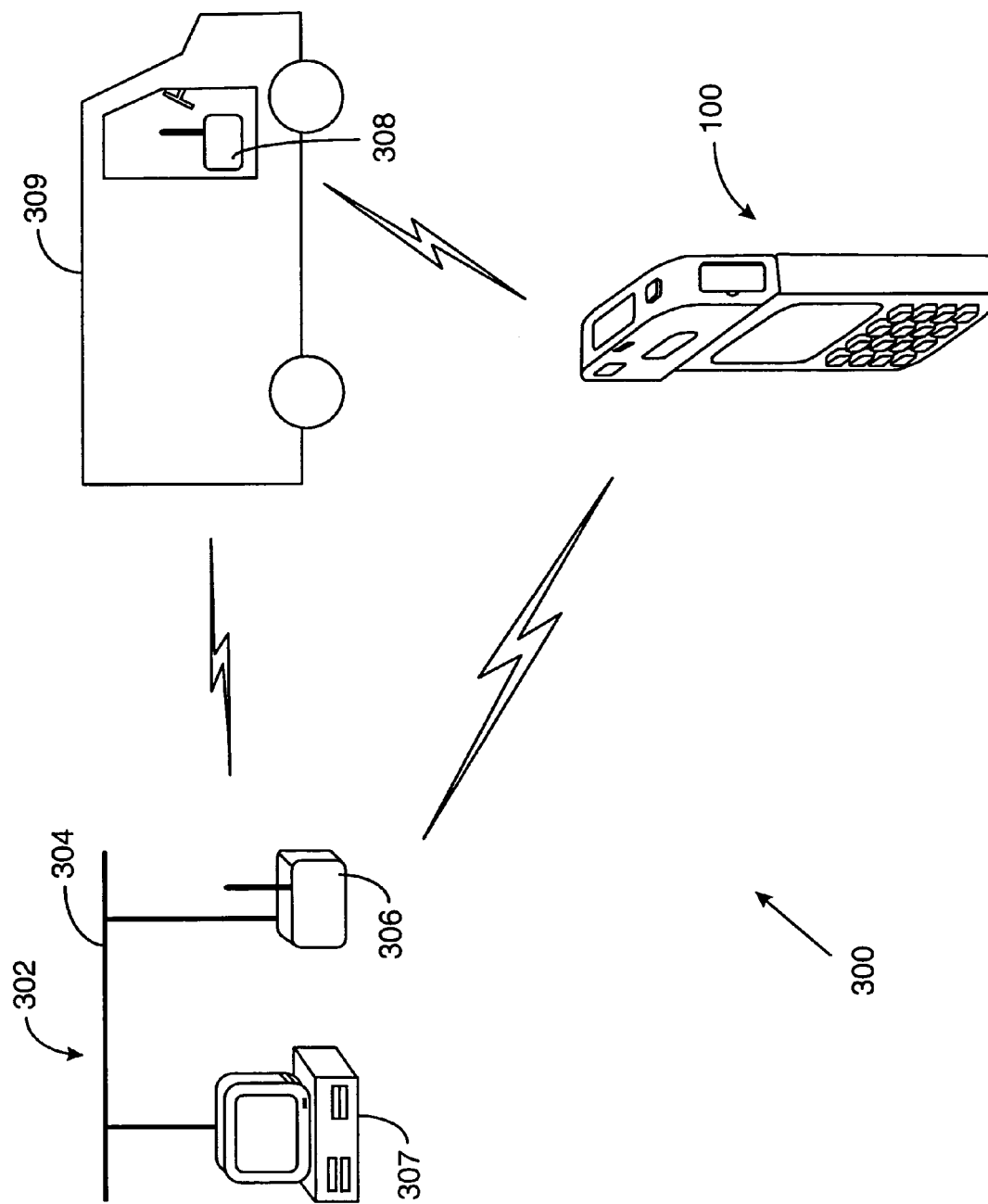
FIG. 3 is a perspective view illustrating operation of an image capture system of FIGS. 1 and 2 operating in conjunction with wireless and wired networks in accordance with the present invention.

FIG. 3 illustrates a communication network 300 including the image capture system of FIGS. 1 and 2. Specifically, the communication network supports both batch and real-time communication between the image capture system 100 and a remote wired network 302 at a central location either directly or indirectly via a mobile access device 308. If configured for direct communication, the system 100 includes a wide area network (WAN) or cellular radio.

The wired network 302 includes a wireless access device 306 connected to a wired network backbone 304. The wireless access device 306 could be either a wireless access server providing file and processing service as well as buffering and relaying functionality or a wireless access point (only providing buffering and relaying functionality). The mobile access device 308 supports communication between a mobile unit 309 and a remote wired network 302, between the image capture system 100 and the mobile unit and between the image capture system 100 and the remote wired network 302. Alternatively, and or additionally, if so configured, the image capture system 100 may communicate directly with the wireless access device 306. Thus, the wireless network may include short range communication between the mobile unit 309 and the image capture system 100, medium range communication between the mobile unit 309 and the wireless access device 306, and longer range communication between the image capture system 100 and the wireless access device 306 depending upon the relative locations of the devices, or any combination thereof.

One or more computer systems 306 may also form part of the wired network 302. Through the wired network 302 and wireless network, the computer system 306 communicates with the mobile unit 309 and the image capture system 100. The wired network 302 may comprise a local area network or a wide area network connected by various wired or wireless links. For example, the wired network 302 may comprise a wired telephony network including a cellular telephony network. Thus, any user participating on the wired network 302 may communicate with the image capture system 100.

In operation, the image capture system 100 transfers captured photo and coded images to the mobile access device 308 which selectively processes, stores and forwards the images to the wired network 302 via the wireless access device 306. The image capture system 100 similarly transmits data relating to the captured images to the mobile access device 308 and the wired network 302. The image capture system 100 also receives information from the mobile access device 308 and the wired network 302. In one application, the image capture system 100 captures and decodes coded images and utilizes the decoded information to request information from the mobile access device 308. The request made to the mobile access device 308 may include captured images. In response, the mobile access device 308 delivers requested stored information to the system 100 and delivers the request, captured images, and related information to a user of the computer system 307 at a remote central location. After review of the information and captured images, the user of the computer system 307 initiates a transmission of instructions to the image capture system 100. The user of the image capture system 100 then receives the instructions and responds accordingly. Additionally, the user of the computer system 307 might also dispatch the mobile unit 307 to another location to pick up or deliver goods, reposition goods, or otherwise service the identified location.

The image capture system 100 may also request processing or storage via the mobile unit 309. In particular, servicing such a request, the mobile access device 308 performs such processing or storage of the data if the mobile access device 308 is so configured. Otherwise, such storage or processing requests are forwarded to the wired network 302 for servicing. Such forwarding may occur in real-time, periodically in batch or when in range of the wireless access device 306. For example, a vehicle mounted computer that is part of the mobile access device 308 might be used to decode two-dimensional images or authenticate signatures whose images are captured by the system 100. Access device 308 may have a higher power transmitter and processing capability than the hand-held unit because it is powered by a vehicle's electrical system and does not have the same portable power constraints. Additionally, the mobile access device 308 may provide access to a wired network within the mobile unit 309 and may accommodate, for example, mobile peripherals (such as printers) disposed within the mobile unit 309.

Although the mobile unit 309 is shown as resembling a van, the mobile unit 309 may constitute another type of mobile unit as well such as a forklift or truck. Similarly, the mobile unit 309 may constitute the user of the system 100. In such a configuration, the user might wear the mobile access device on a belt while carrying the system 100. Moreover, as previously mentioned, the mobile unit 309 and mobile access device 308 need not be present at all. In such configurations, the system 100 directs all requests and communications directly to the wireless access device 306.

Service organizations may also use the system of FIG. 3. In these organizations, service persons each carrying an image capture system 100 travel to service locations. The mobile access device 308 may or may not be deployed with each system 100. At the service locations, the service personnel use the image capture systems 100 to gather information relating to the equipment to be serviced. Gathered information, including captured images, may then be transferred via the wireless or mobile access device 306 to a computer 307 connected to the wired network 304 at a central location. At the central location, images are evaluated and information relating to the equipment being service is accessed and sent back to the service personnel using the image capture system 100. Thus, by using the image capture system 100 in such a configuration, a single, experienced service person located at a central location can deliver servicing expertise to less experienced personnel without having to be physically present at the service location. Moreover, by providing photo images of units under service, particular parts required to fix units under service may be more easily identified at the location where replacement parts are kept, and immediately ordered or dispatched to the service organization. Such use reduces the time needed to complete the service while minimizing the number of trips to the location. It also reduces the cost of transmitting repair parts to work sites by reducing erroneous deliveries.

The system 300 of FIG. 3 may also be used to capture and transfer video from the image capture system to a mobile unit or central location. By successively capturing frames of photo images at a high enough rate (approaching 30 frames per second), the image capture system effectively captures video. Such video may be transmitted at some time after a video "clip" has been captured, or may be transmitted in real-time. Existing communication links may be employed to support such transfers without modification. The video information transferred may be viewed as it is received or may be stored and viewed at a later time.

Because data transfer bandwidths between the system 100 and the mobile access device and/or wireless access device 306 may, at times, not be sufficient to transfer continuous image sequences, image data may be periodically buffered prior to its transfer. However, if the image capture rate exceeds available data transfer rates for a period of time, memory for buffering captured images becomes full. At this time, the system 100 indicates a full condition to the user. Depending upon predetermined settings, the system 100 either ceases capturing video at this time or continues to capture images and writes over previously captured images. Images are then transferred in the nearest order of receipt possible. Alternatively, the system 100 may capture a video clip, cease capturing images when available memory is full and retain the clip for processing until directed to transmit the clip by the user. Processing may include deleting images, editing images, decoding images as well as other processing functions. After processing, the video clip may then be transferred to a remote location.

Figure 4A:
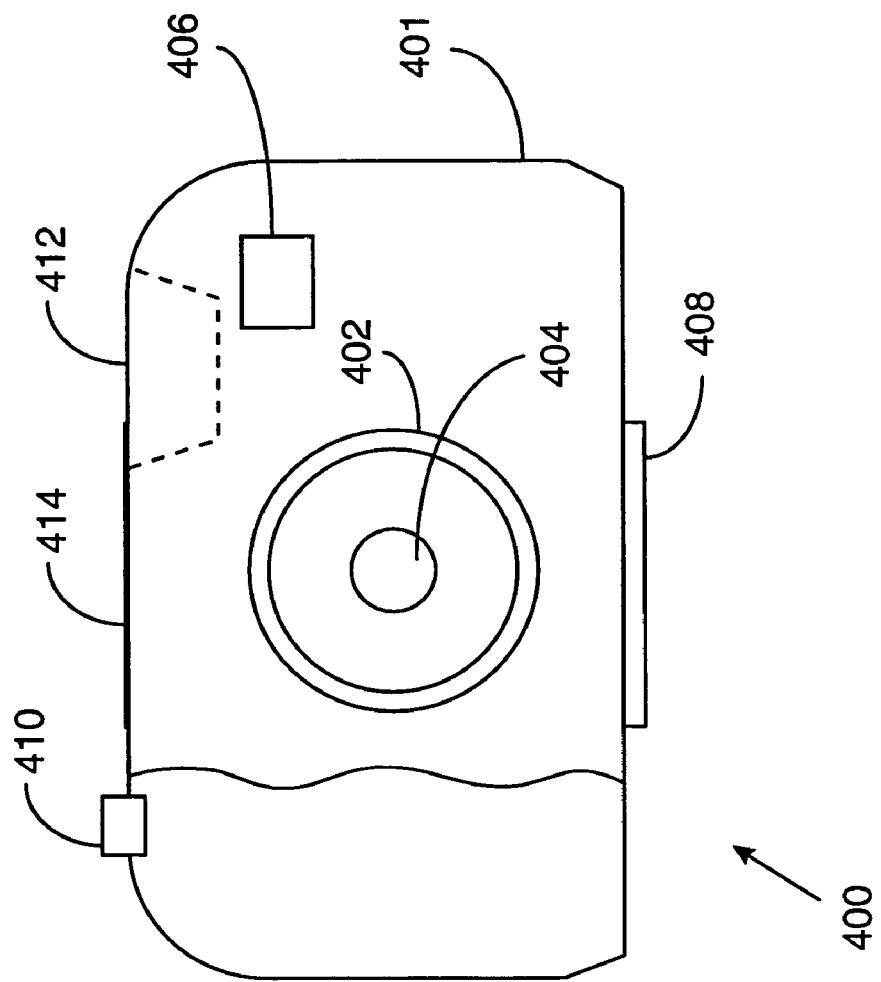
FIG. 4a is a front view of an image capture module of the present invention with the module having a illumination reflector unit positioned in a retracted position.
Figure 4B:
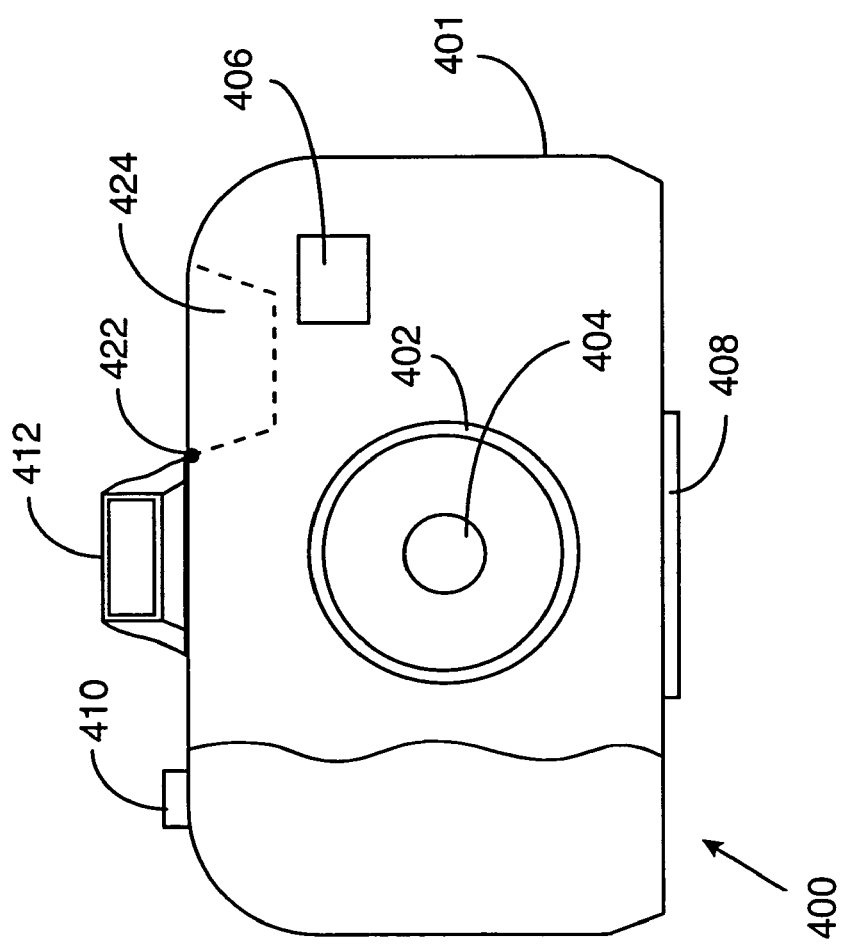
FIG. 4b is a front view of the image capture module of FIG. 4a with the illumination reflector unit in an extended position to provide background illumination during capture of an image.

FIGS. 4a and 4b illustrate further detail of the image capture system 100 of FIGS. 1 through 3. In particular, an image capture module 400 is designed to function much like a typical film based camera. The components of the image capture module 400 are disposed upon or contained within a housing 401. The housing 401 is constructed of a plastic material that is inexpensive to manufacture but both durable and lightweight. A lens casing 402 provides a mounting location for a lens system 404. The lens system 404 provides a portion of the optical path of the module 400 for use when the module 400 is in a vertical orientation to capture photo images. Although the lens system 404 is a fixed focus assembly, adjustable focus systems are well known and might be employed as an alternate.

A view finder 406 may be used to correctly align the module 400 for the capture of photo images. In a single image capture mode, a capture button 410 allows a user to initiate the capture of a particular photo image. In a multiple image capture and store mode, the capture button 410 allows a user to initiate the start of capture of images upon depression and the end of capture upon release. In a fixed-duration image capture and store mode, a user initiates the capture of a fixed number of images by depressing the capture button 410. Finally, in a multiple image capture without storage mode, the module 400 continuously captures and displays images until the capture button 410 is depressed. Upon depression of the button 410, the currently displayed image is retained.

Once captured, images may be reviewed by a user on the display of a terminal unit. However, if at time of capture, the module 400 is separated from the terminal, captured images may be displayed on a display of the module or retained until they may be displayed on-the terminal unit. In the process of such review, the user may discard any image that does not prove satisfactory. After review and selection, the stored images may be transferred to a central location via a wired or wireless link.

The image capture module 400 illuminates the target area using a built-in illumination source and illumination reflector unit 412 as is required for image capture purposes. The illumination reflector unit 412 is operable in two positions: 1) a first position (retracted position) wherein the illumination reflector unit is retracted (as in FIG. 4a) to provide illuminating light to a target when the system operates in a horizontal orientation; and 2) a second position (extended position) wherein the illumination reflector unit is extended (as shown in FIG. 4b) to provide illuminating light to a target when the system operates in a vertical orientation. In the extended position, as illustrated in FIG. 4b, the illumination reflector unit 412 snaps into place to cover the window 414 located on top of the module 400 and to fully reflect illumination light provided by the built-in illumination source through the window 414 onto a target. In the retracted position, as illustrated in FIG. 4a, the illumination reflector unit 412 retracts into a cavity 424 in the housing 401 to fully expose the window 414 and allow illumination light to exit the window 414 to illuminate a target. In either position, illuminating light may or may not be provided by the built-in illumination source depending upon ambient lighting conditions and the need for additional illumination.

The illumination reflector unit 412 rotates on a pivotal axis 422 between the extended and retracted positions. When in the retracted position, the illumination reflector unit 412 retracts fully into the body 401 to prevent damage to the unit. A system operable only in the vertical orientation may be constructed so that illumination is enabled only when the illumination reflector unit 412 is in the extended position.

The illumination reflector unit 412 could be configured in other ways to provide background lighting during the capture of images. For example, a simple pop-up illumination reflector unit or even a fixed illumination reflector unit could be provided that would provide background lighting during capture of a photo image. Separate illumination devices could be provided for the horizontal and vertical orientations depending upon the embodiment.

Figure 5A:
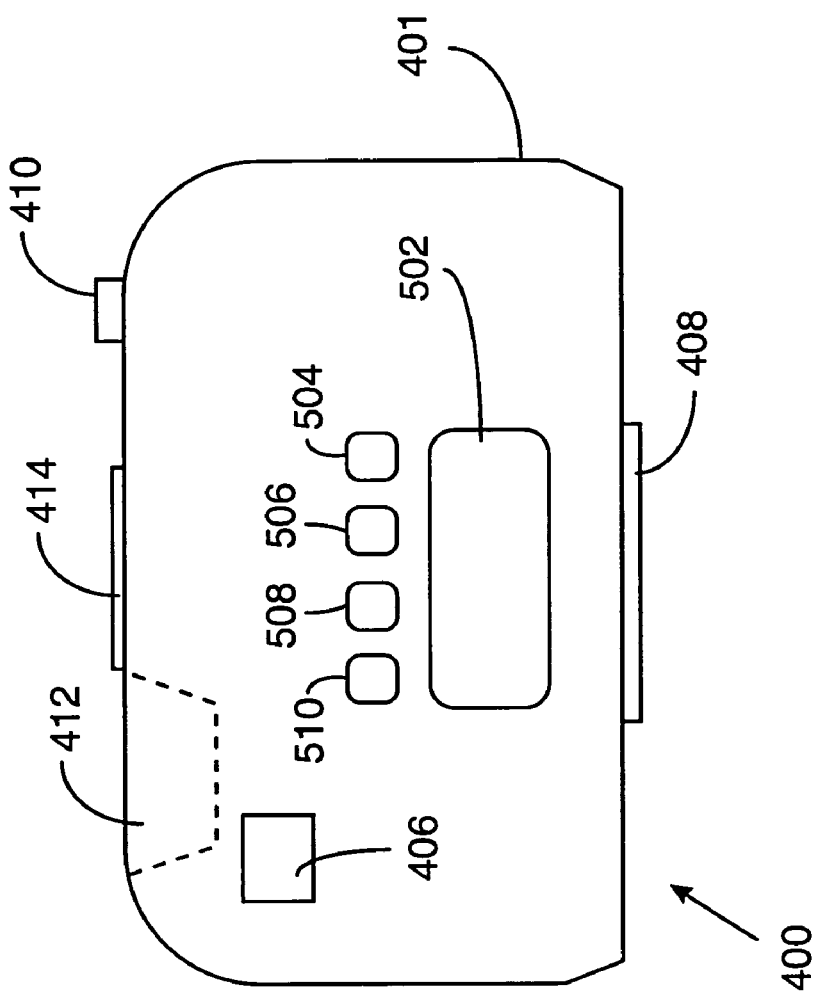
FIGS. 5a and 5b are rear views of the image capture module of FIGS. 4a and 4b corresponding to FIGS. 4a and 4b respectively.
Figure 5B:
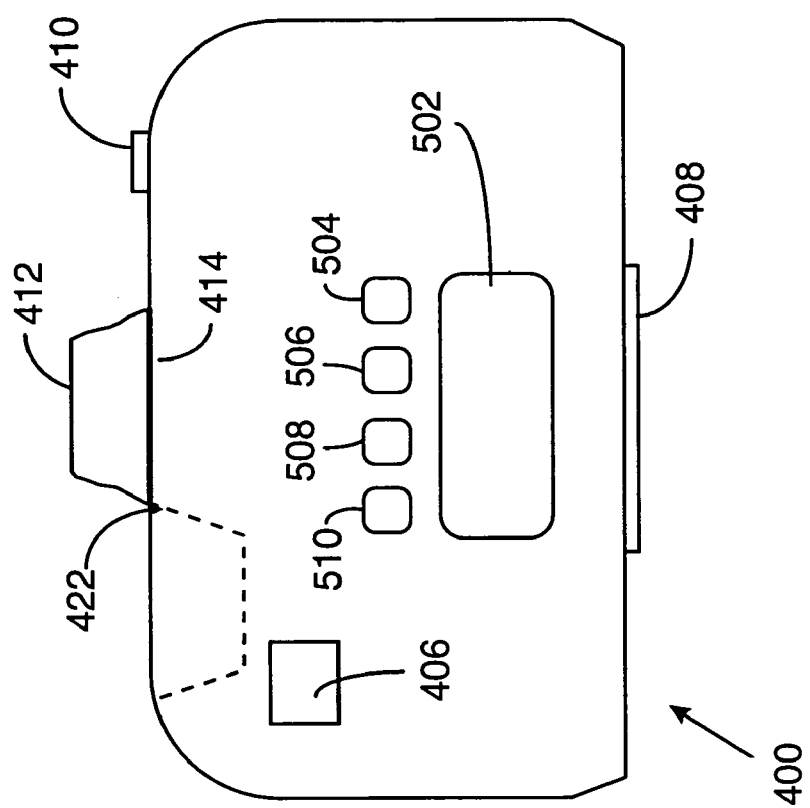

FIGS. 5a and 5b are rear views of the image capture module 400 of FIGS. 4a and 4b, respectively. FIG. 5a illustrates the image capture module 400 with the illumination reflector unit 412 in the retracted position while FIG. 5b illustrates the module 400 with the illumination reflector unit 412 in the extended position. As shown, the module 400 also includes a display 502 that provides information to a user. Buttons 504, 506, 508 and 510 allow the user to alter the functionality of the image capture module 400. For example, buttons 504 through 510 may be used to alter or adjust the optical path, to vary the rate at which images are captured, to vary the intensity or duration of the illumination device, to vary exposure time and/or to vary the operating parameters of the photo-detector array. The buttons may also be used to initiate data transfer, to execute functions relating to image review, and to purge or retain images. When docked with the terminal unit, the user may also interact with the module 400 via the terminal unit's interface.

Figure 6A:
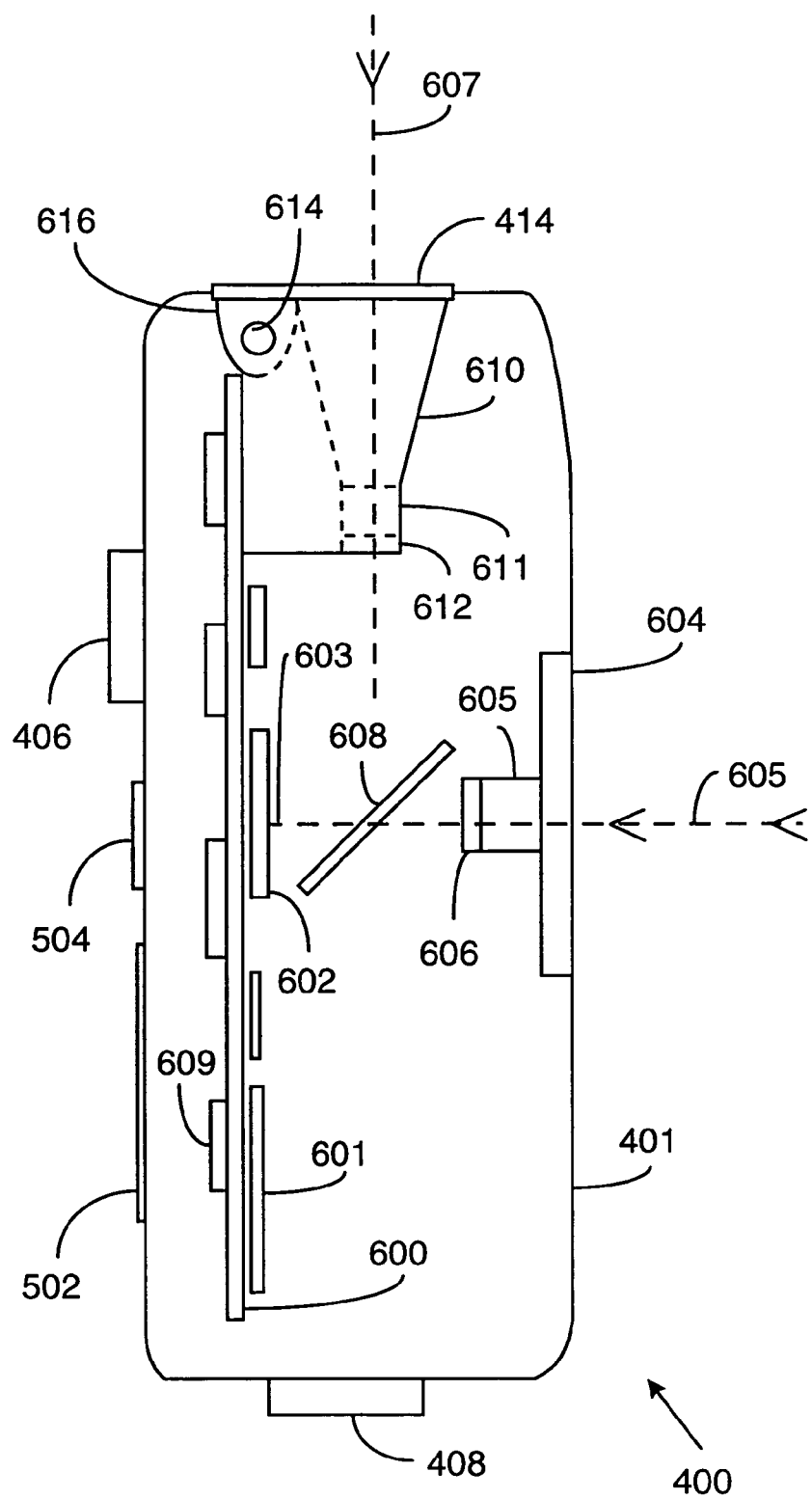
FIG. 6a is a cut-away side view of the image capture module of FIGS. 4 and 5 illustrating components contained within the module.

FIG. 6a is a sectional side view of the image capture module 400 taken along the optical paths of the image capture module 400 of FIGS. 4a, 4b, 5a and 5b. A first optical path involves the capture of coded images when the module is in the horizontal orientation. The second optical path involves the capture of photo images when the module is in a vertical orientation. The optical paths overlap within the housing to converge on a photo-detector 602. The optical paths are each fixed in the embodiment shown. However, in other embodiments, one or both of the optical paths may be adjustable. Further, in still other embodiments, the optical paths may completely overlap and include adjustable lensing systems that alter the optics of the system for coded image and photo image capture.

When capturing coded images, light reflected from a target enters the housing 401 through a window 414, passes through an encasement 610, a lens system located 611 within the encasement 610 and a shutter 612, and is reflected from a first side of a one-way mirror 608 onto the photo-detector 602. An aperture within the encasement 610 operates to adjust depth of field by varying the amount of light allowed to pass through the shutter 612. The lens system 611 provides a fixed focal length designed for capturing coded images. The encasement 610 is fixed with respect to a printed circuit board 600 upon which the photo-detector 602 is mounted so that incoming light is properly aligned and focused onto the photo-detector 602. The encasement 610 is sealed with respect to the housing 401 and prevents random light from entering the optical path through the shutter 612 to the photo-detector 602 during the capture process.

To capture photo images, reflected light target travels from a target through an opening 604 in the housing 401, a lens system and aperture contained in an encasement 605, a shutter 606 and through one-way mirror 608 onto the photo-detector 608. The mirror 608 is a one way, reflectivity mirror that reflects light received along path 607 but that appears transparent to light received along path 605. The lens system contained within the encasement 605 is also fixed focus and provides optical performance commensurate with the capture of photo images. Unlike the lensing system 611 utilized for capturing coded images, the lens system used for capturing photo images has a wider angle and deeper field of view for allowing a user greater flexibility in the capture of photo images.

Prior to the capture of either a coded image or a photo image, the photo-detector 602 is precharged. Exposure of the photo-detector 602 to the reflected light causes portions of the photo-detector 602 to lose charge (typically elements photosensitive elements of the photo-detector 602), thereby leaving a pattern of the reflected light as remaining charge in the photo-detector 602. After exposure, the pattern is retrieved from the photo-detector 602, conditioned and processed. The resultant signal set comprises the captured image and represents the pattern of reflected light applied to the photo-detector 602.

To avoid multiple image sources from simultaneously converging along the path 603 onto the photo detector, the shutters 612 and 606 selectively permit light to pass. Operation of the module 400 allows only one of the shutters 612 and 606 to open during each capture cycle to avoid image overwriting. Control of the shutters 612 and 606, the apertures and the photo-detector 602 adjusts the magnitude of the images captured and compensates for lighting conditions, image contrast and other optical variations a user faces when operating the system.

Contained within the casing 401 of the image capture module 400 is a circuit board 600 upon which the photo-detector 602 is mounted. In the embodiment shown, the photo-detector 602 comprises a two dimensional charge coupled device. The photo-detector 602 permanently mounts on a circuit board that also includes additional electronic components. The circuit board 600 is constructed to provide complete functionality to the image capture module 400 and includes a module controller 601 that is electrically coupled to the photo-detector 602 and the components in the optical paths via signal processing components to control their operation. The circuit board 600 includes a memory 609 that stores images captured by the module 400. These images may then be transferred to a terminal unit and then to a central location as required by a user. The circuit board 600, encasement 610, encasement 605 and mirror 608 all mount to the case 401 to maintain optical alignment. The circuit board 600 is powered by a battery installed within a battery compartment previously described with reference to FIG. 1. The circuit board 600 includes connections to buttons 504 through 510, display 502 and the image capture button 410.

The module controller 601 of the circuit board 600 decodes coded images when directed. The module controller 601 also evaluates the resolution, position and relative size of coded images captured via the photo-detector 602. Information relating to the evaluation is selectively delivered to a user via the display 502 (or the terminal unit display) along with instructions regarding repositioning of the module 400 with respect to a coded image so that a captured coded image may be obtained that is decodable. Such instructions to the user may include, for example, moving the module 400 closer to the coded image or aiming or positioning the module 400 left or right with respect to the coded images. Further instructions may include use illumination in capturing a satisfactory coded image. By providing such feedback, decode processing of a coded image is not attempted unless the module 400 is correctly positioned. Thus, unnecessary decode processing is not performed which otherwise would likely result in failure of attempted decode.

An internal illumination source includes a light source 614 and a reflector 616. The light source 614 is activated by the control circuitry 601 to provide illuminating light 614 when required to illuminate targets during the capture of images. The illuminating light is reflected by reflector 616 and directed out the window 414 toward the target by an illumination reflector unit 412. Reflector 616 prevents light produced by the light source 614 from entering the housing 401. When capturing coded images in the horizontal orientation with the illumination reflector unit 412 in the retracted position, illuminating light is directed toward a target in a line of site normal to the window 414, illuminates the target, and reflected illuminating light is received by the module 400 through the window 414.

Figure 6B:
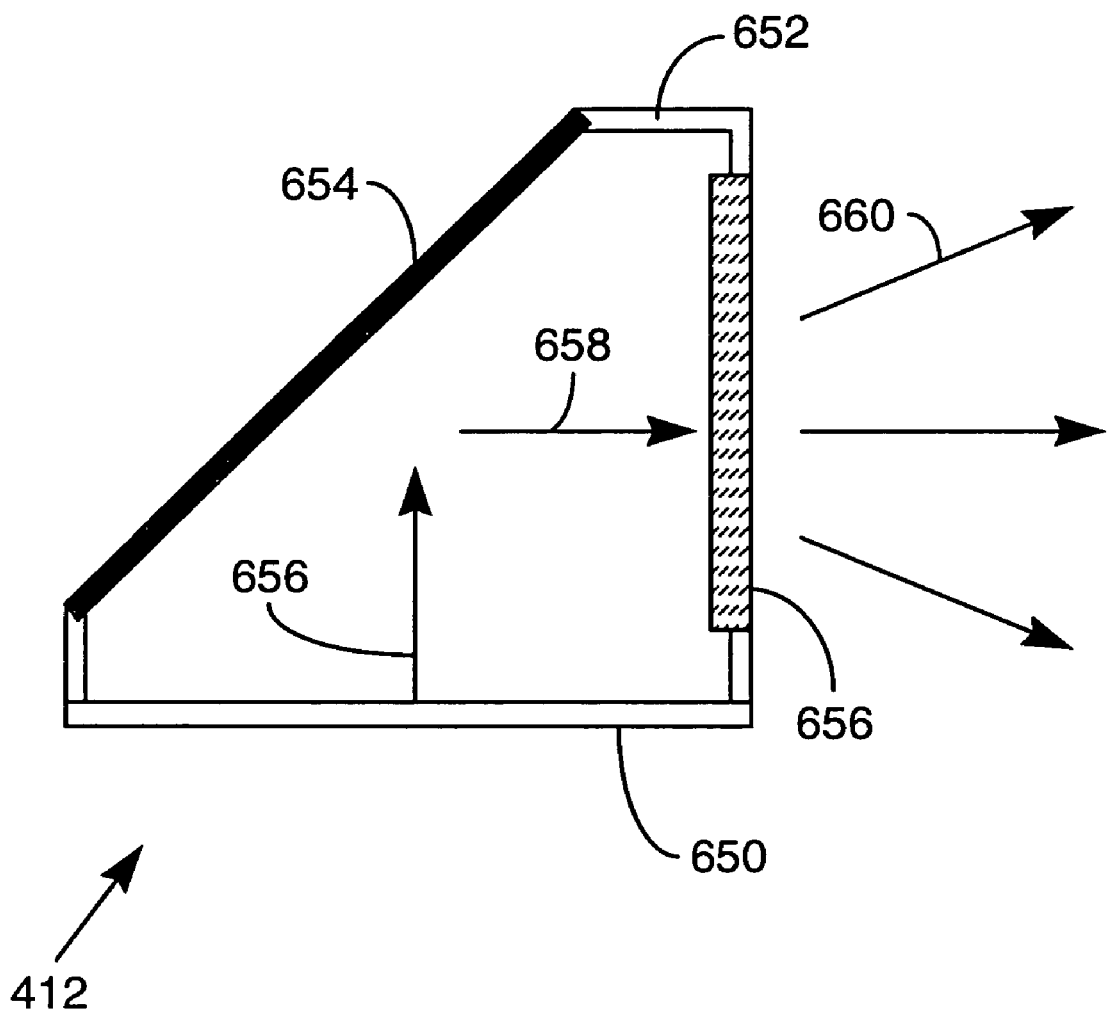
FIG. 6b is a cut-away side view illustrating the illumination reflector of the image capture system.

FIG. 6b illustrates an illumination reflector unit 412 for reflecting light provided by the light source 614 through the window 414 toward a target when in the extended position. The illumination reflector 412 includes a transparent widow 650 through which illuminating light 656 is received from the light source 616, Illuminating light 656 received through the transparent window 650 strikes a reflecting surface 654, reflects from the reflecting surface to produce redirected illuminating light 658 that passes through a diffusing lens 656. The diffusing lens diffuses the illuminating light 658 to produce diffused light 660 which illuminates a target within view of the diffusing lens 656. Opaque walls 652 support the transparent window 650, reflecting surface 654 and diffusing lens 656.

As previously discussed, in one mode of operation, when the illumination reflector unit 412 resides in the extended position it activates the light source 614. Activation of the light source 614 may include providing continuous illumination during each capture cycle both during and between the capture of images. This mode of operation would be appropriate when ambient lighting conditions prevented a user from adequately framing a target without the illumination. In other modes of operation, activation of the light source 614 may comprise providing illumination only during the capture of each image. Such mode of operation would be appropriate when sufficient ambient lighting allowed for the framing of a target but insufficient ambient lighting existed for the capture of a satisfactory image.

Figure 7A:
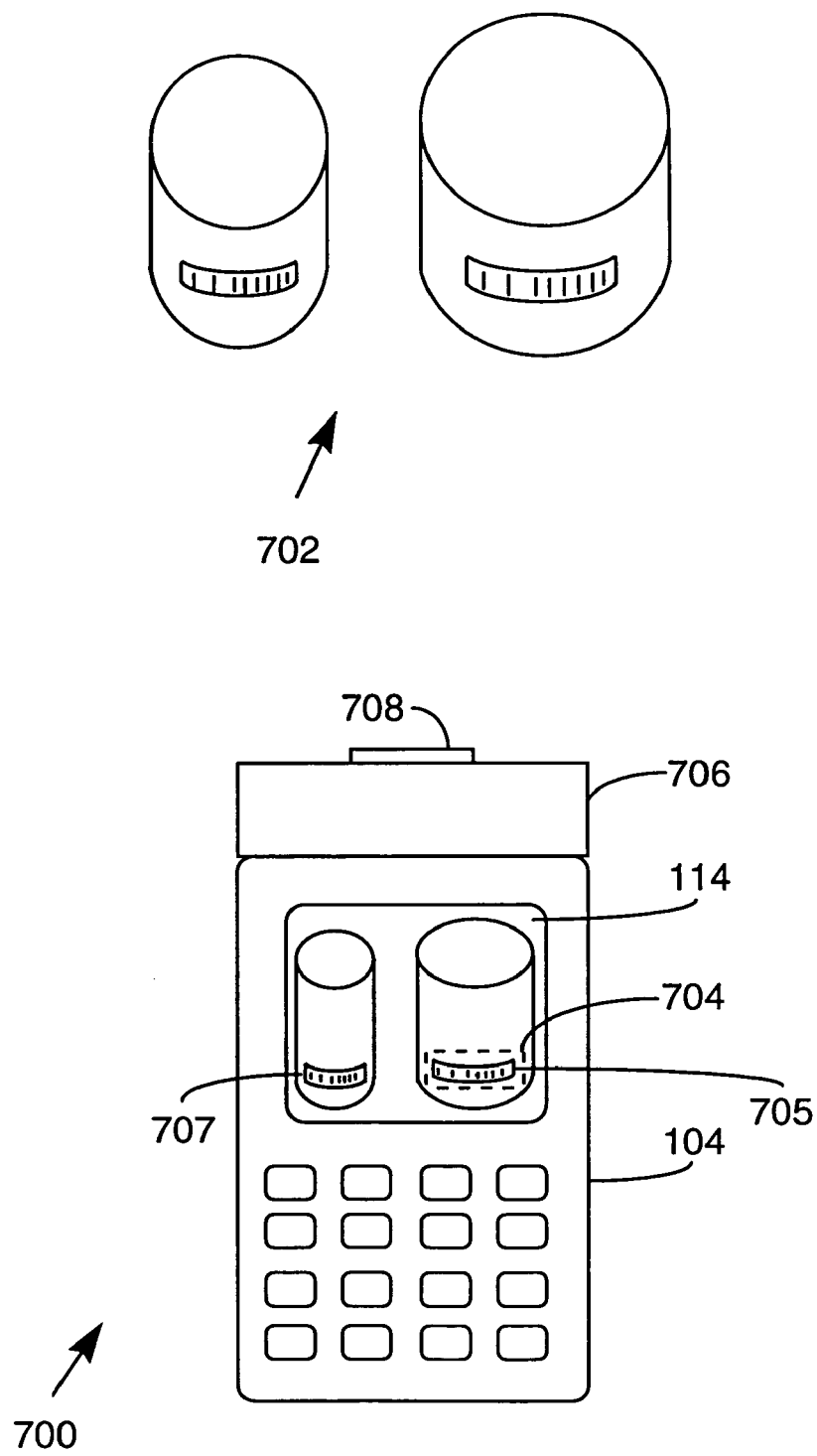
FIG. 7a is a perspective view of an image capture system of the present invention operable only in a horizontal orientation, the system operating to capture and decode a coded image, to display the coded image on a display and to identify a coded target within the captured image.
Figure 7B:
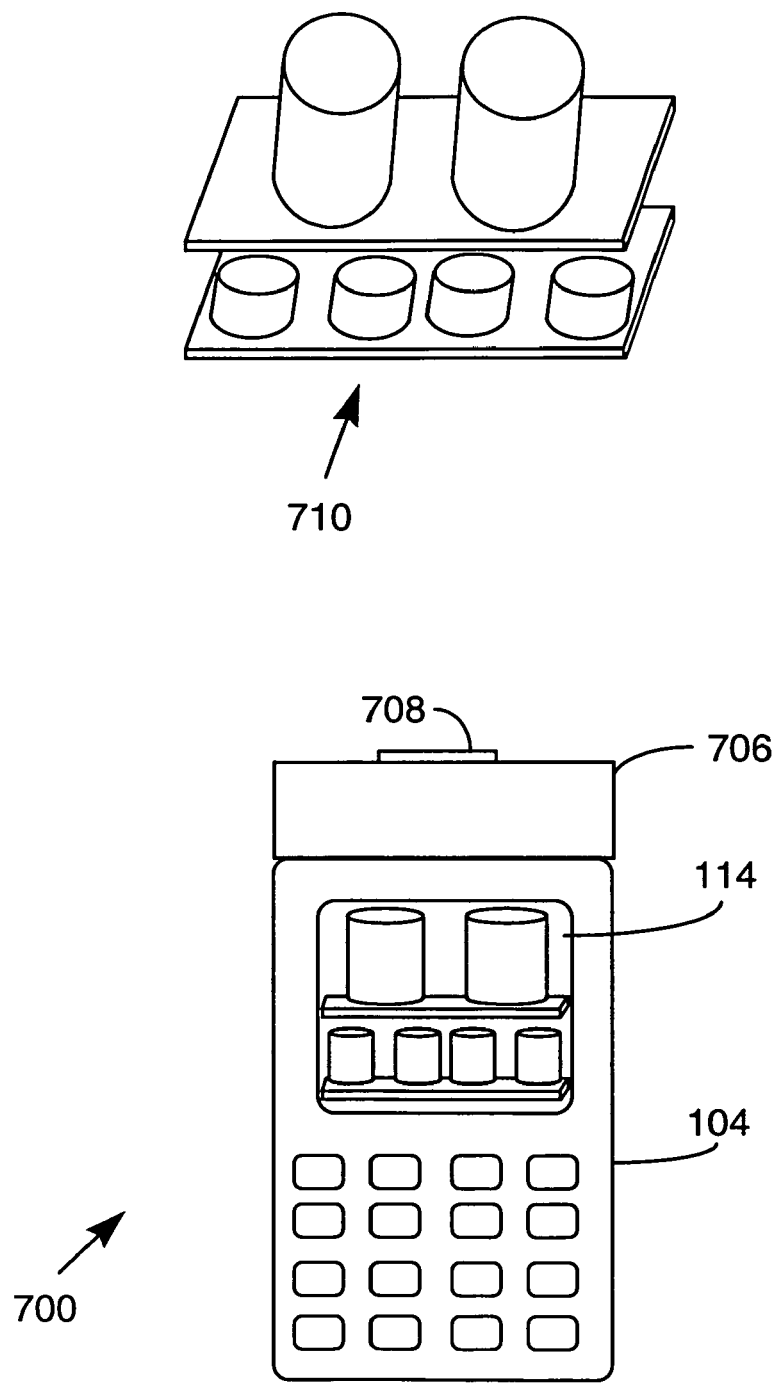
FIG. 7b is a perspective view of the image capture system of FIG. 7a operating in a horizontal orientation to capture a plurality of photo images, to display the captured photo images on the display as captured and to provide a user with an opportunity to edit, purge and permanently retain images from those captured.

FIGS. 7a and 7b illustrate an image capture system 700 configured to capture coded images and photo images when in a horizontal orientation. With particular reference to FIG. 7a, the system 700 includes an image capture module 706 mounted on a terminal unit 104, the image capture module having a window 708 through which reflected light from a target is received during capture of an image. The system 700 is shown capturing one dimensional coded targets located on a cans 702 that may reside on a shelf space. After capture, the captured coded image is displayed on the display 114 of the terminal unit 104. As shown, the captured coded image contains two one-dimensional coded targets 705 and 707, both displayed for the user.

After capture, coded image detection circuitry detects coded targets within captured images and outlines 704 on the display 114 a most centrally located coded target 705 within the coded image captured by the image capture module 102. Instead of outlining coded targets, the system 704 could shade the detected coded target instead. The system 700 prompts the user to select a coded target for decoding from those displayed, by default prompting the user to select the most centrally located coded target 705. In another mode, instead of selecting the most centrally located coded target 705, the system 700 selects a coded target which appears largest within the captured images, in this case, the outlined coded target 705. Such indication would also be provided by outlining or highlighting the other coded target. In still another mode, the system selects a most likely decodable coded target within the captured image.

Through a cursor control interface, the user may select for decoding the most centrally located coded target present 705 or may select the other coded target 707. Other interface paths that also be employed to select coded targets, including the keypad interface, mouse, pointer or any other mechanism that allows a user to select a coded target from among one or more coded targets. These same user feedback paths allow the user to review and selectively retain, discard, decode or transmit captured images during operation of the image capture system 700.

The system 700 also determines whether one or more of the coded targets present in a captured image has sufficient quality for decoding and indicates its determination on the display 114. For example, outline 704 surrounding displayed coded target 705 may indicate that the coded target 705 is sufficient for decoding while the lack of outline around coded target 707 indicates that the coded target is insufficient for decoding. In another mode of operation, two or more of the coded targets could be outlined, each of which are sufficient for decoding. A user could then toggle between the outlined images with a user interface and select one or more of the coded targets for decoding. In still another mode, when multiple images are captured, the system 700 could identify common decodable targets within each captured image and identify a best version of each of the coded targets for decoding.

The system 700, by reviewing captured images for coded targets, also determines in what fashion the system 700 should be repositioned with respect to the target to capture a better image of the target 702. For example, if the captured coded targets has insufficient resolution, the system 700, via the display 114, indicates to the user to position the system 700 closer to the target 702. Likewise, if the angle of capture to the target 700 is too great, the system 700 directs the user to reposition the system 700 laterally so that the system 700 may capture the target 700 at a more normal angle. Feedback relating to positioning could be provided as a readout or could be provided via display of an arrow on the display 114, relating the current position of the system 700 with respect to a more desired position of the system 700 relative to the target 702 for capture.

The system 700 also may provide positioning information based upon attempted decoding. After the capture of each coded image, the system may attempt to decode the image. If the decode attempt is successful, an indication is provided to the user. However, if the decode is unsuccessful, an indication is also provided but with additional repositioning instructions. A user would then following the repositioning instructions in an attempt to captured a decodable coded target.

Once a decodable image is captured, the system 700 may cease capturing images until decode is accomplished or may simply continue to collect images and store those captured images that contain decodable coded targets. A user may then access the stored decodable images for editing and parsing prior to decoding the images. Alternatively, the user could decode the coded images on demand, transmit the coded images to another location for storage or transmit the coded images for decoding.

Thus, the image capture system 700 of the present invention allows a user to 1) view an image prior to its decoding; 2) determine whether a coded target exists within the image; and 3) determine the adequacy of the coded image. By providing these functions, the system 700 operates with fewer power consuming decode cycles.

In operation, the system 700 may capture coded images at regular intervals or may capture images at the depression of a capture button. As each coded image is captured, the captured image is displayed on the display 114. The system 700 then makes a determination as to whether any coded targets present in the captured coded image are decodable. If any of the coded targets is decodable, the system 200 places an outline 704 about the decodable coded target(s). If not, the system 700 provides repositioning instructions to the user. Upon the next capture cycle, the process is repeated. At any time during this sequence, the user may initiate a decode on one or more of the coded targets identified on the display 114. During decode, image capture and coded target selection may continue while the system 700 decodes images in the background. Further, during capture, selected images may be transmitted to a remote location, transmitted to storage to be permanently retained or may otherwise be processed. Thus, the system may multi-task to allow a user to perform the various functions available.

To minimize storage and transfer requirements, the system 700 can extract a coded target from the captured coded image, perhaps the portion contained within the outline 704. This portion of the captured images then serves as the coded image to be decoded by processing circuitry. By extracting non-decodable portions of the captured image, the remaining portion may be more easily stored and transmitted. In operation, circuitry of the system 700 scans the entire image, identifies coded targets, defines boundaries about the identified coded targets and prompts a user to extract remaining portions of the image. When multiple coded targets are present within an image, the system 700 allows a user to extract some of the coded targets.

FIG. 7b illustrates the image capture system 700 of FIG. 7a operating to capture a photo image while in a horizontal orientation. The system 700 captures photo images using the same optical path that was used to capture coded images, as illustrated in FIG. 7a. The optical path of the module 706 has an adjustable lensing system that varies focal length, aperture and other qualities consistent with the required image capture.

Prior to operation, a user controls the image capture system 700 via user input to enter a coded image capture mode or a photo image capture mode. The system 700 then adjusts its optics for the particular use. Alternatively, the system 700 operates in a default mode wherein the optics are adjusted for the capture of photo images. Each captured image is then scanned upon capture for coded targets. When the system 700 detects a coded target within the captured image, the system 700 either enters a coded image capture mode by modifying its optics accordingly or notifies the user that a target is present within the image. The system 700 then gives the user the option of entering a coded image capture mode or continuing to capture photo images.

As illustrated in FIG. 7b, images are displayed upon the display 114 as captured so that the display 114 provides the user guidance in aligning the system 700. Since the module 706 has no viewfinder, the display 114 provides the only guidance to the user in aligning the system 700 with respect to the target 710.

Images are either captured and displayed periodically at a predetermined rate or captured at the initiation of the user singly or multiply by the depression of a capture button. In one mode of operation, the system 700 captures a series of images and temporarily buffers the images. From the buffered images, the user directs the system to store selected images or transfer the selected images to another location. The system 700 may prompt the user to permanently store captured photo images and/or to transmit the captured photo image to a central location. The system 700 may also allow the user to parse and edit the sequence to select some or all of the images for storage or transfer.

The system 700 of FIGS. 7a and 7b may include a two-dimensional laser scanning device to capture images instead of the photo-detector described. In the embodiment, a scanning laser scans the target 710 to capture an image of the target. Once captured, the system 700 operates on the captured image in the same or a similar fashion as it operates upon an image captured with a photo-detector. By using as scanning laser, illumination is not required and, in some cases, a less complex optic system may be employed.

Figure 7C:
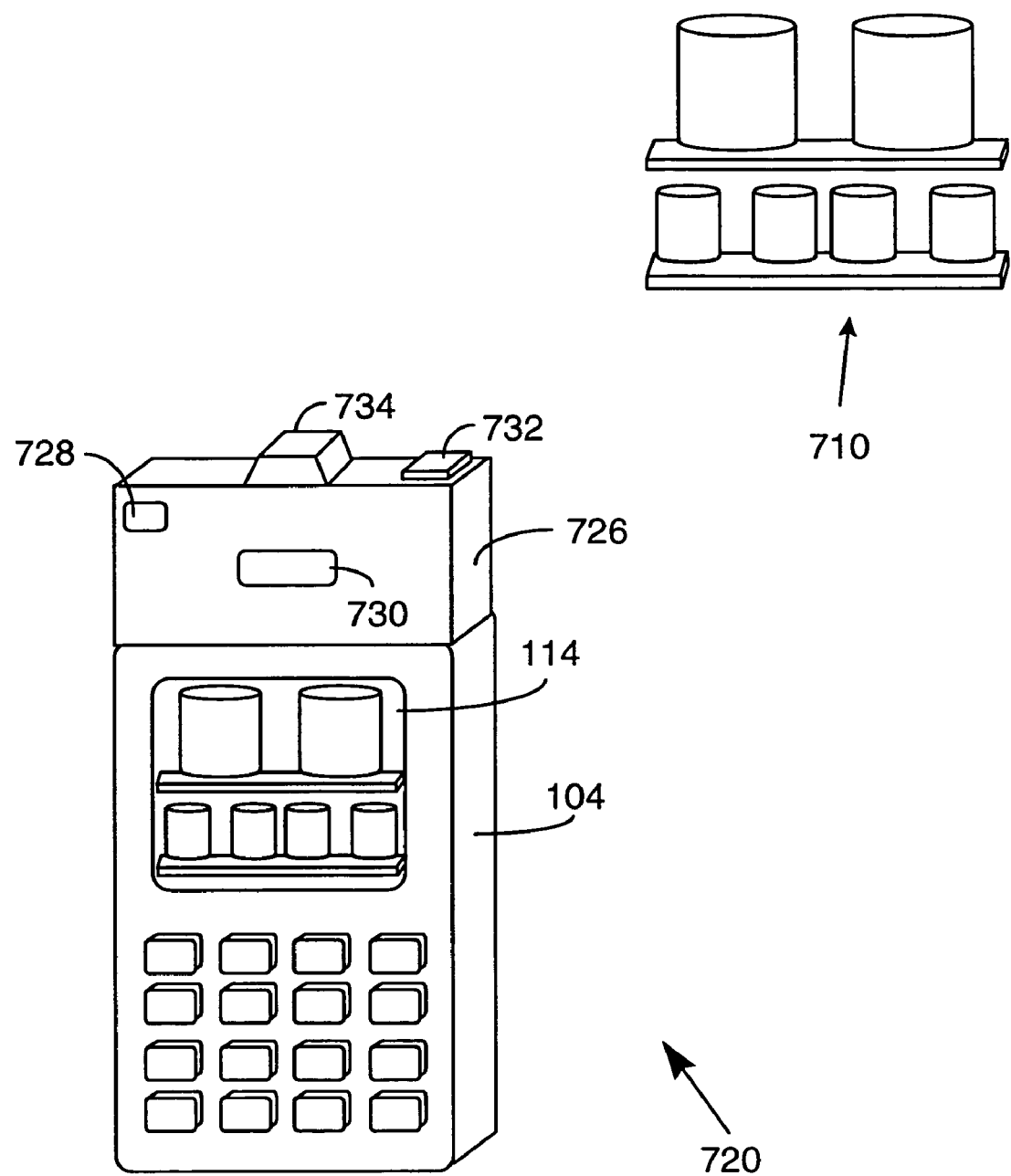
FIG. 7c is a perspective view of an alternate embodiment of an image capture system of the present invention which is capable of capturing both photo images and coded images in a vertical orientation, displaying images on a display as captured and allowing a user to edit and selectively decode the captured images.

FIG. 7c illustrates an image capture system 720 operable in a vertical orientation to capture both photo images and coded images. The system 720 includes a module 726 connected to a terminal unit 104. The module 726 includes internal components similar to those illustrated in FIG. 6a. However, the module 726 includes a single optical path that is alterable to capture either photo images or coded images and operable only with the module 726 in a vertical orientation.

The module includes a viewfinder 728 that may be used to frame the target 710. However, captured images may also be displayed upon the display 114 on the terminal unit or a smaller display 730 located on the module 726. Thus, the display 114 provides a secondary mechanism for framing targets. Further, because the display 114 also provides an indication of the quality of the captured image, the display 114 provides valuable information to the user unavailable through use of the viewfinder 728 along. The module 726 also includes a capture button 732 depressable to capture images, to select images from previously captured images or to otherwise control the operation of the system 720.

The module 726 may be operated in a photo image capture mode or a coded image capture mode. The captured image is displayed on the display 114 of terminal unit 104 as it is captured. In conjunction with the prior figures, the image capture system is using the second configuration of the optical path to capture the photo image. As previously described, the optical path employed to capture photo images has a wider field of vision and a greater depth of vision than does the optical path used to capture coded images. As images are collected in the embodiment of FIG. 7c they are displayed on the display 114 and buffered, potentially to be permanently retained. A photo image may be permanently retained upon the initiation of a user at which time the image may be moved to memory in the terminal unit 104, moved into permanent memory in the module 726 or may be transmitted to a central location. A image may be permanently retained via user initiation at any of the user interfaces available, such as the buttons or the keypad.

Figure 8:
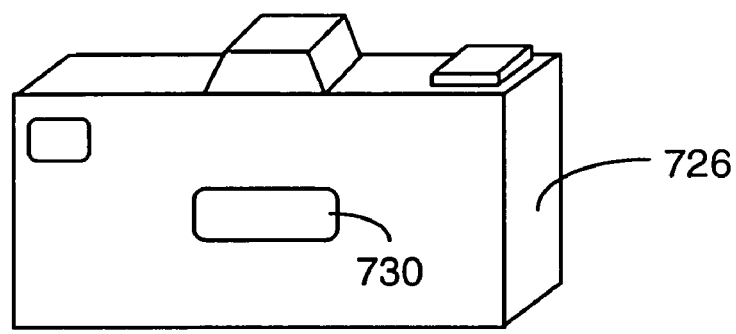
FIG. 8 is a perspective view of an image capture system of the present invention illustrating independent operation of an image capture module and a terminal unit when separated.
Figure 8:
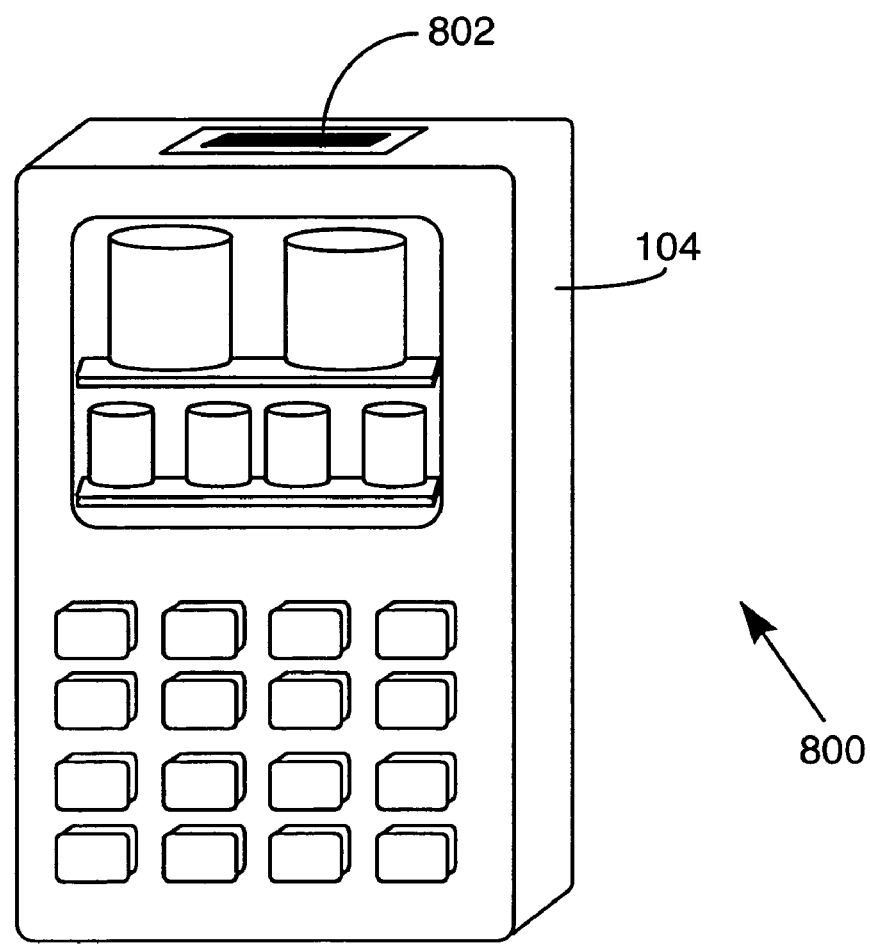

FIG. 8 illustrates operation of the image capture module 726 apart from the terminal unit 104. Connector 802 electrically couples the module 102 to the terminal unit 104 to facilitate control and data transfer between the image capture module 726 and the terminal unit 104. The image capture module 726 operates, separately powered by an onboard battery, to capture images and store images. Once captured, the images may be retained within the module 726 for later transfer to the terminal unit 104, may be decoded within the module 726 or may be parsed and selectively deleted by a user via review on the display.

Figure 9:
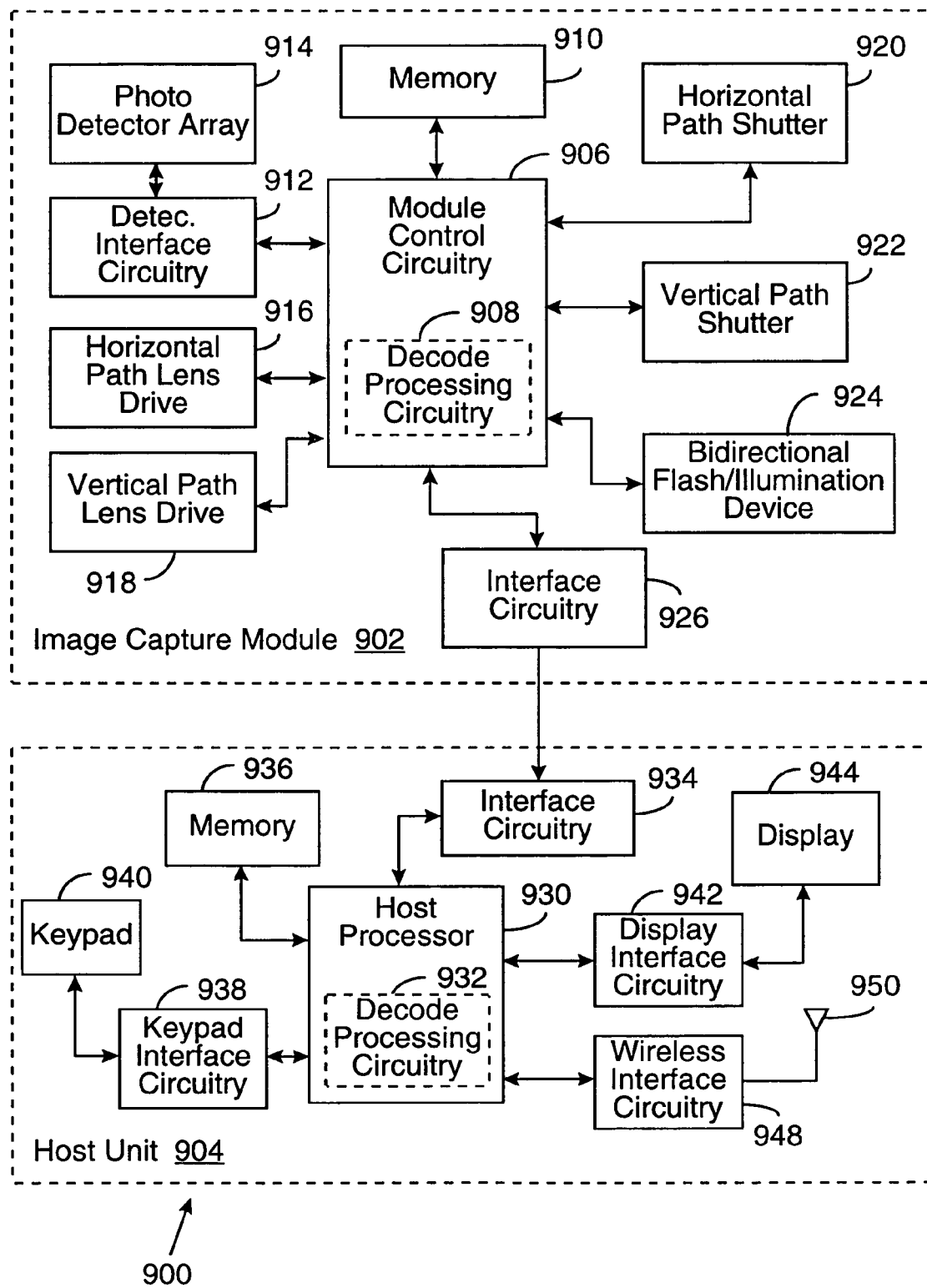
FIG. 9 is a schematic block diagram illustrating components of an image capture system of the present invention that is capable of capturing photo images and coded images, processing the images, parsing the images, transmitting the images, and communicating with a remote location via a wireless link.

FIG. 9 is a block diagram illustrating functional components of an image capture system 900 that employs a combination of electrical and mechanical components to capture, store and process images. In general, the system 900 includes an image capture module 902 and a host unit 904 (or terminal unit). These components may be separately or commonly housed.

The image capture module 902 comprises module control circuitry 906 which controls the various components within the image capture module 902. The module control circuitry 906 may comprise a digital processor, a digital controller, an application specific integrated circuit (ASIC) or other circuitry capable of controlling the components of the module 902. The module control circuitry 906 may include decode processing circuitry 908 capable of decoding coded images. Memory 910 couples to the module control circuitry 906 and stores data and instructions and may include read-only-memory, static random access memory, and/or dynamic access memory. Instructions relating to the operation of the module control circuitry are stored in the read-only-memory while data, such as captured images, are stored in random access memory. In other embodiments, the memory 910 includes image buffering locations or separate image buffers for temporarily storing captured images. Alternately, a separate image buffer could be included within the image capture module 902 or within the terminal unit 904. Moreover, the image memory 910 may be segregated such that a portion of the memory 910 is dedicated to buffering images while the remaining portion may be used as required.

A photo-detector array 914 converts light reflected from a target into corresponding electrical signals. The photo-detector 914 may comprise a photo-sensitive charge coupled device (CCD) array that upon exposure to reflected light when enables, generates an electrical pattern corresponding to the reflected light. Photo-detector interface circuitry 912, controlled by the module control circuitry 908, interrogates the photo-detector array 914 to receive an unconditioned captured image, typically in an analog format. The detection interface circuitry 912 conditions the image and buffers the image for delivery to the module control circuitry 912. Alternatively, the image capture module 902 may include a laser scanner and a photo-detector. In the alternative embodiment, the laser scanner scans in either a one-dimensional or two-dimensional mode to capture one-dimensional and two-dimensional images, respectively. Laser scanners are known in the art and the discussion of such is merely to illustrate the different types of photo-detectors besides charge-coupled photo sensitive element arrays that may be used in accordance with the present invention.

The image capture module 902 also includes lens drive systems for adjusting the optical paths employed to focus reflected light from the target upon the photo-detector array 914. When the module 902 includes two optical paths, one for capturing coded images and one for capturing photo images, the module 902 may include a horizontal path lens drive 916 and a vertical path lens drive 918. However, as previously described, the differing paths may each include fixed focus lensing systems that require no control. In an image capture module 902 capable of capturing both coded images and photo images using a common optical path, either the horizontal path lens drive 916 or the vertical path lens drive 918 operates to adjust the optics of the path to capture the desired type of image.

The module control circuitry 906 controls a horizontal path shutter 920 and a vertical path shutter 922 to expose the photo-detector array 914 with reflected light. When the image capture module 902 includes two optical paths, one for capturing photo images and one for capturing coded images, the shutters 920 and 922 are selectively opened to expose the photo-detector array 914. In the embodiments illustrated in FIGS. 1 through 6, the horizontal path shutter 920 provides shuttering function during the capture of images when the system operates in a horizontal orientation while the vertical path shutter 922 provides shuttering functions during the capture of images when the system operates in a vertical orientation.

The module control circuitry 906 operates the shutters 920 and 922 to ensure that the photo-detector array 914 receives sufficient levels of reflected light to expose the array 914. During daylight conditions, the module control circuitry 906 monitors ambient lighting levels via the photo-detector array 914 or a separate level indicator. Based upon the ambient lighting conditions, the module control circuitry 906 determines the shutter opening duration during a capture cycle. After the capture of an image, the module control circuitry 906 modifies subsequent shutter operations to ensure correct exposure levels.

The module control circuitry 906 may also modify aperture settings for the optical paths or direct the user of the system to modify the aperture settings. Further, the module control circuitry 906 may modify operation of the photo-detector array 914 based upon prior image qualities and other factors to properly capture images.

When ambient lighting conditions are insufficient to capture images, the module control circuitry either automatically activates a bi-directional illumination device 924 or directs a user to activate the bi-directional illumination device 924. The module control circuitry 906 operates the shutters 920 and 922, the bi-directional illumination device 924, and the lens drives 916 and 918 in cooperation to provide sufficient exposure to the photo detector array 914.

Connections illustrated in FIG. 9 among the various blocks are represented with single lines indicating bi-directional travel of signals. Each of these connections comprises sufficient data and control capability to enable the operation of the particular components. Each of the single lines indicated may comprise one or more separate control and/or data signal lines. However, the single lines may also be implemented using a bus having data, address and control portions for enabling control of the various components of the module 902 and for enabling the transfer of data as required.

Interface circuitry 926 within the image capture module 902 connects to interface circuitry 934 contained in host unit 904 to enable communication between the host unit 904 and the image capture module 902. A host processor 930 of the host unit 904 comprises a micro-processor micro-controller or the like for controlling not only the image capture functions of the system 900 but also the other various functions that the terminal unit may perform. Typical functions include data collection, data processing, and communication functions. The host unit 904 also comprises memory 936, keypad 940 and keypad interface circuitry 938, display interface circuitry 942 and a display 944. These components are known in the art and are not further described herein except to expand on the teachings of the present invention.

The host processor 930 may include functionality or circuitry 932 for decoding coded images. The decode processing circuitry 932 may decode either one dimensional or two dimensional images as required for the particular application. Host unit 904 further comprises a wireless communication interface 948 coupled to an antenna 950. The wireless communication interface 948 comprises particularly a radio frequency radio coupled to the antenna 950 for communicating with other components in a wireless network such as those discussed with reference to FIG. 3. The host unit 904 may also connect to a wired communication system such as the one illustrated in FIG. 3 with appropriate interfaces.

Figure 10:
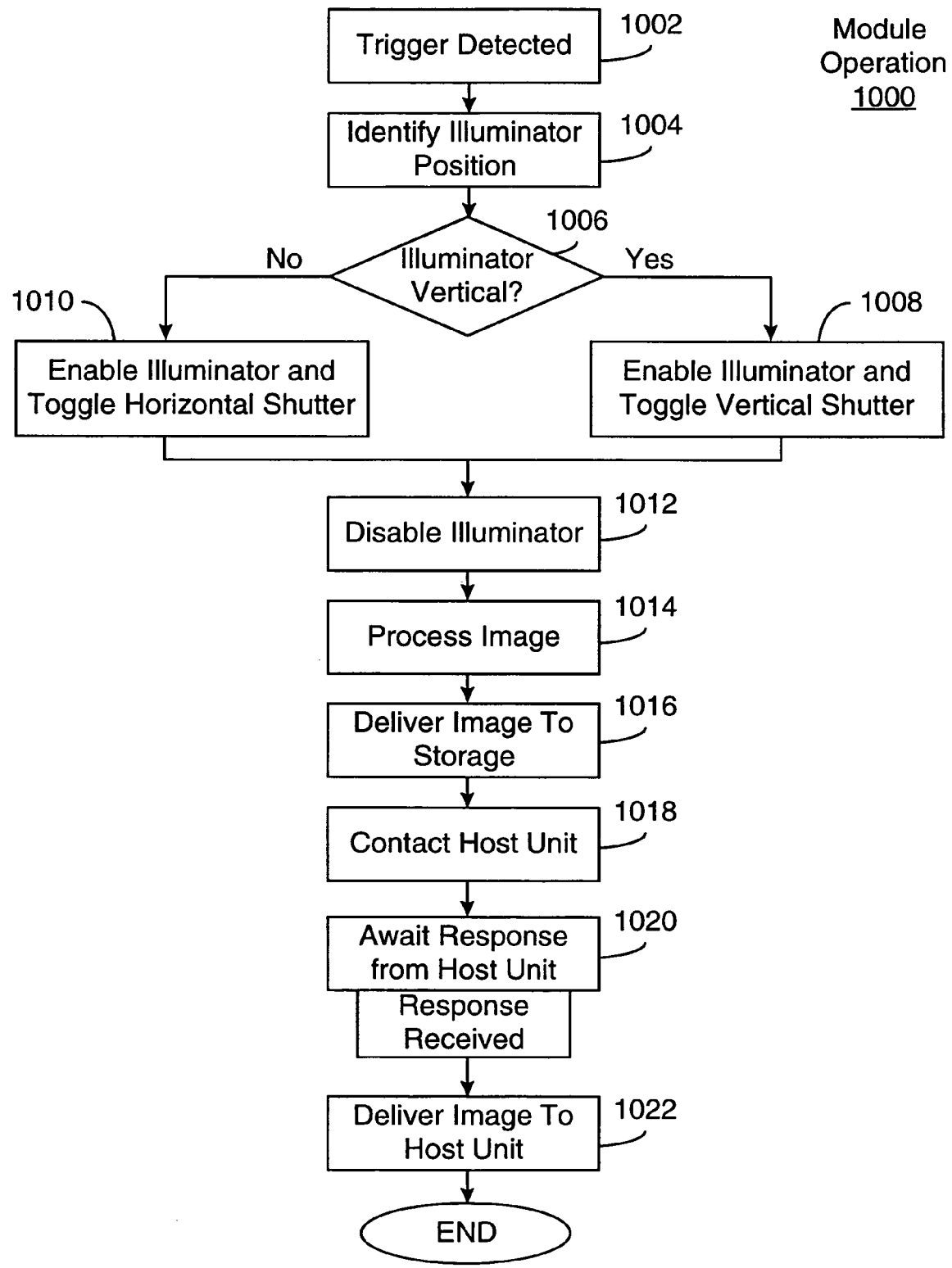
FIG. 10 is a flow diagram illustration operation of an image capture module of the present invention during the capture of images, selectively illuminating a target, the storage of images and the transfer of images to a host unit.

FIG. 10 is a flow chart illustrating an operation of an image capture module of the present invention. Operation 1000 commences at step 1002 wherein a trigger is detected wherein a trigger is initiated. Typically, the trigger is initiated by a user. However, the trigger could also be initiated by a person at a central location or by a timed execution of automatic triggering signals. Once a trigger is detected, the system identifies the illumination reflector unit position 1004 which, in turn, identifies desired operation, image capture in a horizontal orientation or image capture in a vertical orientation. Based upon the illumination reflector unit position, the system determines which optical path will receive reflected light from a target and provides the reflected light to the photo-detector array via a shutter operation. If the system determines at 1006 that the illumination reflector unit is disposed for vertical operation, the system enables the photo-detector array, the illumination light source if required and toggles the vertical shutter 1008. If the system determines at 1006 that the illumination reflector unit is disposed for horizontal operation, the system enables the photo-detector array, the illumination light source if required, and toggles the horizontal shutter 1010. Operations 1008 and 1010 therefore expose the photo-detector causing the photo-detector to capture an images. Consistent with prior discussions, the captured image could be either a photo image or a coded image.

Once an image is captured, the system disables the illuminator 1012 and processes the captured image 1014. In other operations, such as the capture of video images wherein images are captured in rapid succession, the illuminator would not be disabled between the capture of images since such disablement would consume more energy than sequentially enabling and disabling the illuminator. Processing of the captured image 1014 includes receiving the captured image from the photo-detector array, digitizing the capturing image and filtering the captured image. Once the image is processed, the image is stored 1016. Such storage may comprise temporarily retaining the image or permanently retaining the image consistent with operations previously described. The image may also be immediately displayed upon a display of the image capture module if such a display exists. Next, the system contacts the host unit 1018, notifying the host unit that an image has been captured, stored and is available for delivery. the image is processed. Processing of output from a photo-detector array may comprise signal processing or other types of processing to enhance the image, to convert the electrical equivalent of the image to another format or may correspond to various other processing techniques. Once the image is processed, it is delivered to storage at step 1016. After the captured image has been stored 1016, the image capture module contacts the host unit. The image capture unit awaits a response from the host unit 1020 until received and delivers the captured image 1022 upon the response.

The image capture module may repeat steps for capturing images as directed at any time prior to or during transfer of captured images to the host unit. Thus, while the module is transferring images, the module could also be capturing additional images. These additional images are stored in the module, processed and transferred as the functions may be performed. Other operations may also be performed during the performance of the operations described by multi-tasking the operations.

Figure 11:
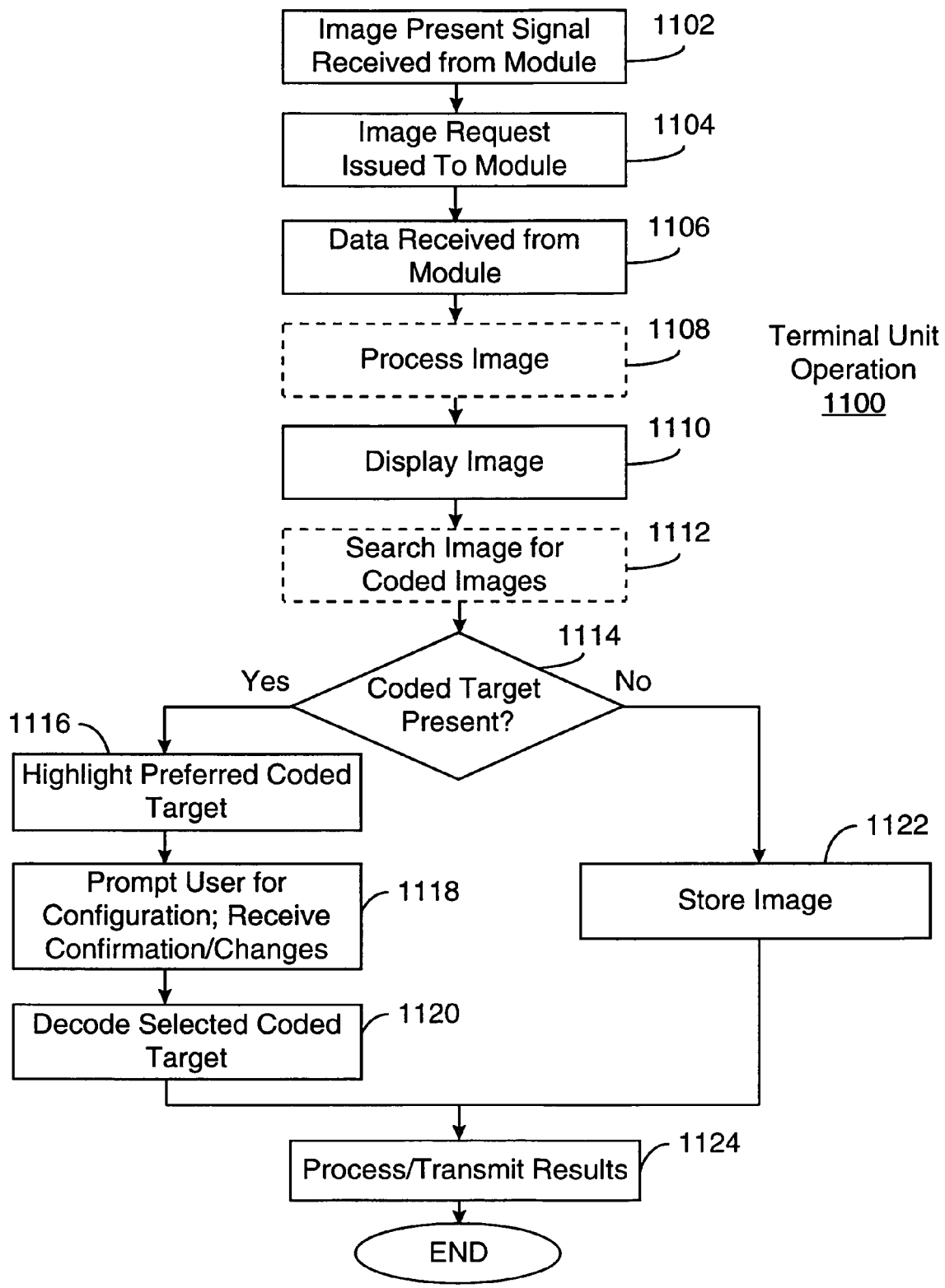
FIG. 11 is a flow diagram illustrating operation of a host or terminal unit of the present invention during receipt of captured images from an image capture module, display of the received images, searching the received images for coded targets, storage of received images and transmission of received images to a remote location.

FIG. 11 illustrates operation 1100 of a terminal unit during the capture and processing of images. This operation 1100 presupposes separation of the image capture module from the terminal unit. This separation may be a physical separation of the module from the terminal unit during capture of images with transfer occurring after images have been captured and buffered in the image capture module. The separation may also simply be a functional separation wherein the image capture module and terminal unit are physically connected during capture of images but operationally distinct. Such an operation could occur when the terminal unit is in a sleep mode during capture of images or when the terminal unit is performing other, unrelated operations during the capture of images.

Operation commences wherein an image present signal is received from the image capture module 1102. As previously illustrated, the signal may comprise a control signal present at the interface (connection) between the image capture module and terminal unit. After an image present signal is received, the terminal unit issues an image request signal to the image capture module. The image capture unit then transmits a captured image and the terminal unit receives the captured image 1106. The terminal unit then processes the image 1108 as may be required prior to displaying 1110 the captured image. Image processing may comprise filtering the image or otherwise preparing the image for display upon a display.

Next, the terminal unit searches for coded images within the captured image 1112. If a coded target is present, the system highlights or outlines a preferred coded target 1116 on the display and prompts the user for confirmation that the highlighted coded target is be decoded 1118. At this point, the user may elect to have the system decode the preferred coded target or, select another coded target for decode 1120. The system then performs further processing on the image if requested and transmits results 1124 to the user or to a remote location.

If no coded target is present in the image, the system assumes that the captured image is a photo image and stores the image 1122. The system then processes the image as requested by the user and/or transmits the image 1124 as requested by the user. Once the operations are complete, the terminal unit operates on other images as directed. Alternately in its operation, the terminal unit 1100 simultaneously performs more than one of the steps illustrated in FIG. 11. For example, a number of images may be received by the terminal unit as one or more of the images already received are being decoded by the terminal unit. Further, images and/or results may be wirelessly transmitted to a remote location during receipt of additional images, decoding and image editing. Concurrent execution of tasks are limited only by system resources such as processing capabilities, wireless communication capabilities, storage capabilities, display capabilities and other system based capabilities.

Figure 12A:
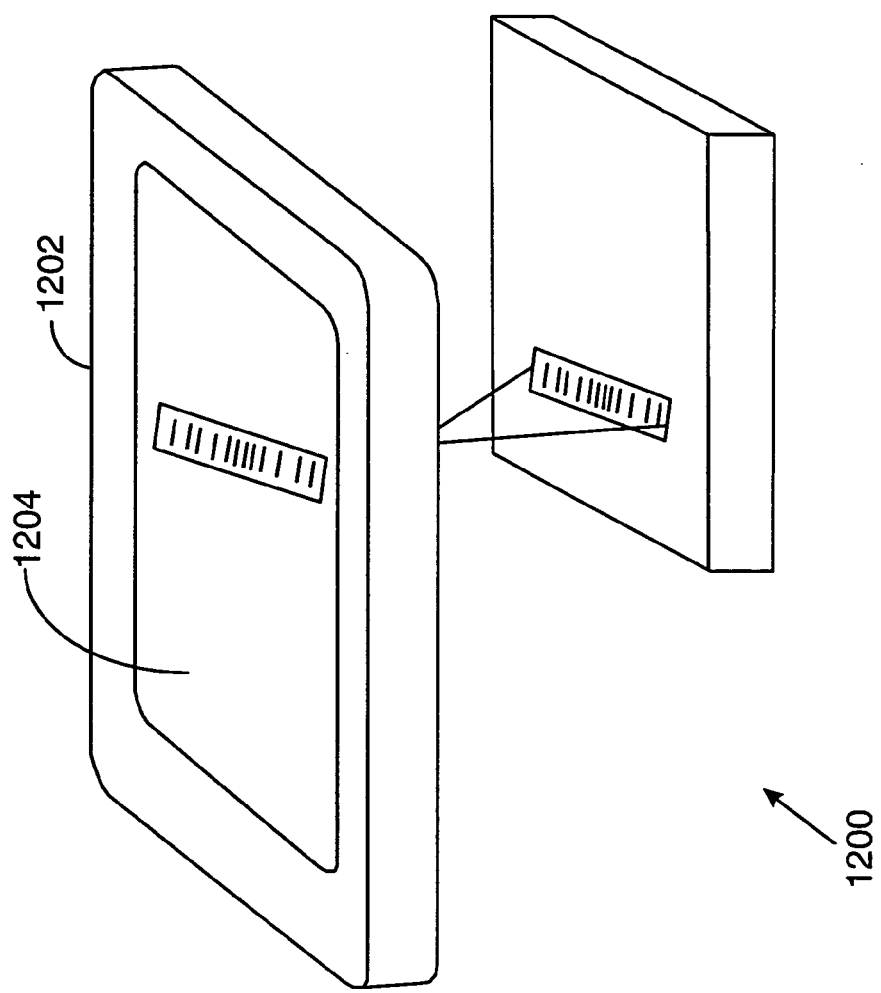
FIG. 12a is a perspective view illustrating an alternative embodiment of the image capture system of the present invention wherein the display of the system permits viewing and targeting of objects that are located behind the system.
Figure 12B:
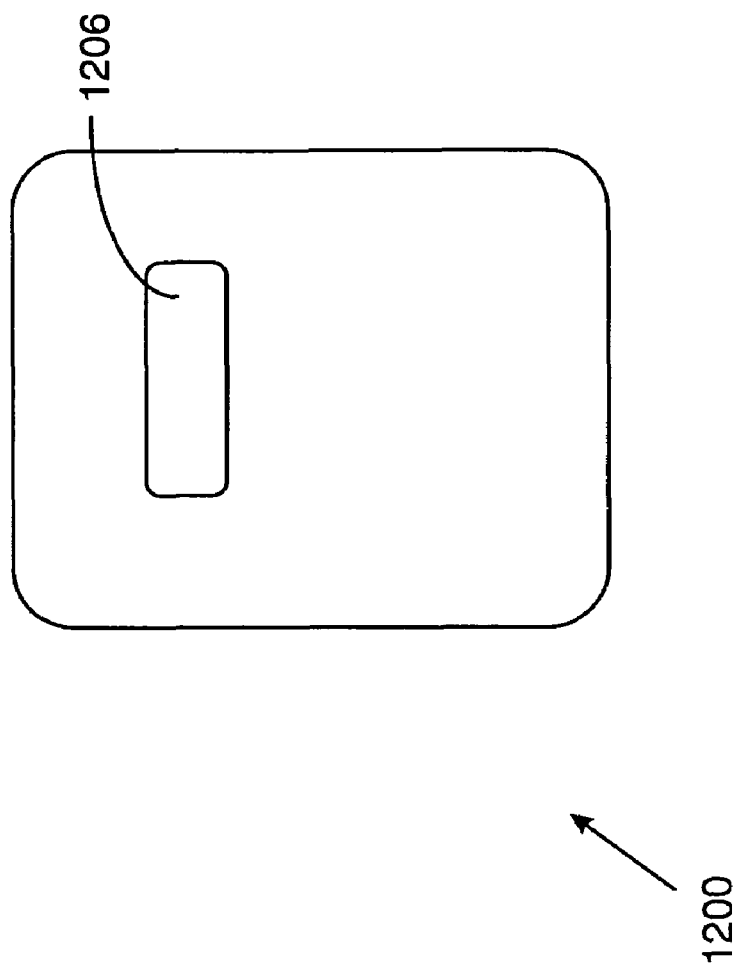
FIG. 12b is a view of a bottom side of the system of FIG. 12a illustrating the location of the optics of the system.

FIGS. 12a and 12b illustrate an image capture system 1200 capable of capturing images located behind the system 1200. The system comprises a case 1202 in which a display 1204 is mounted, the display including a touch or pen-type interface for receiving user input. An optical opening 1206 located on a back side of the system 1200 allows reflected light to enter the case 1202 and be focused onto a photo-detector. This particular configuration may be employed to scan packages shipped by a parcel delivery service. Scanning could include reading coded image targets as illustrated or could include capturing photo images such as address label targets. The images could then be decoded, later downloaded and/or transmitted to another location.

Figure 13A:
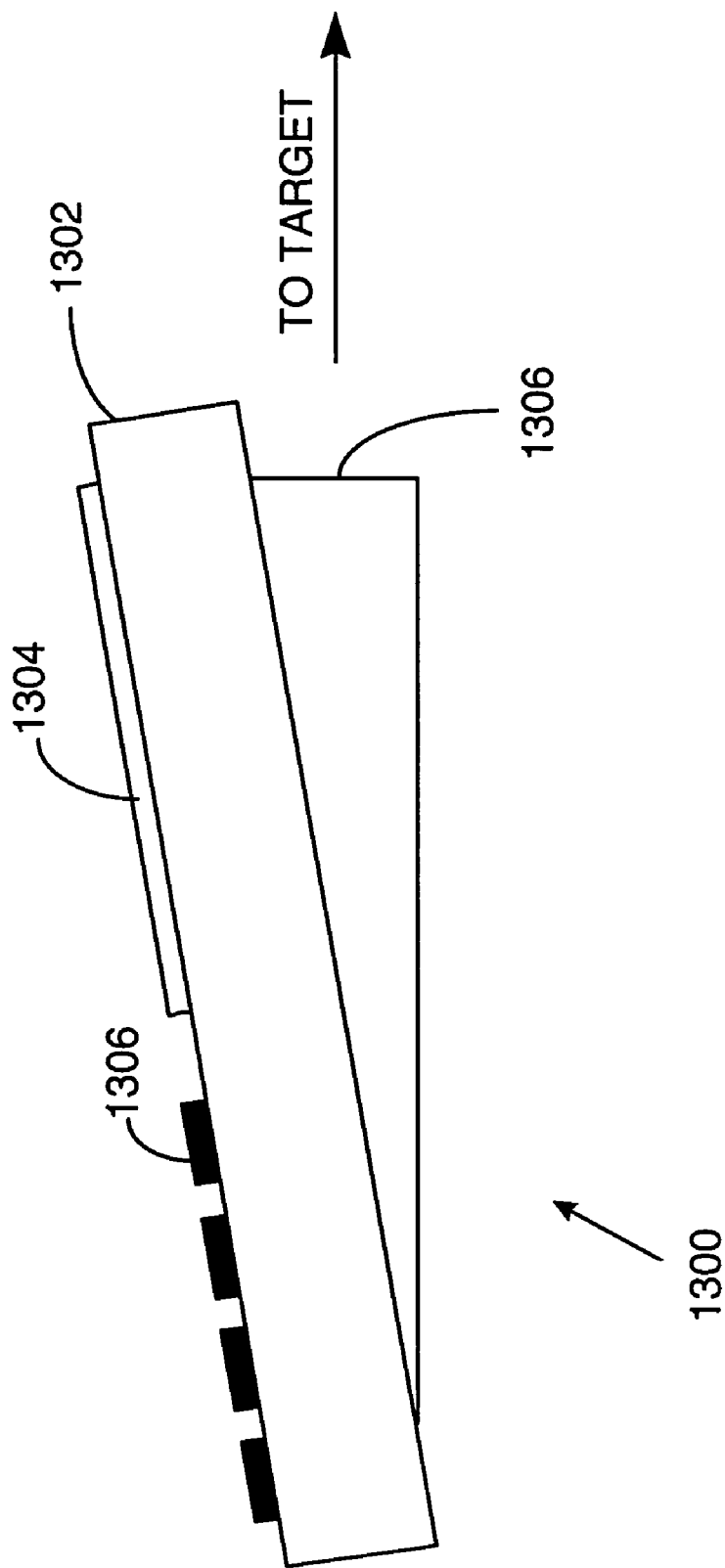
FIG. 13a is side view of a photo and coded image capture system of the present invention for use only in a horizontal orientation.
Figure 13B:
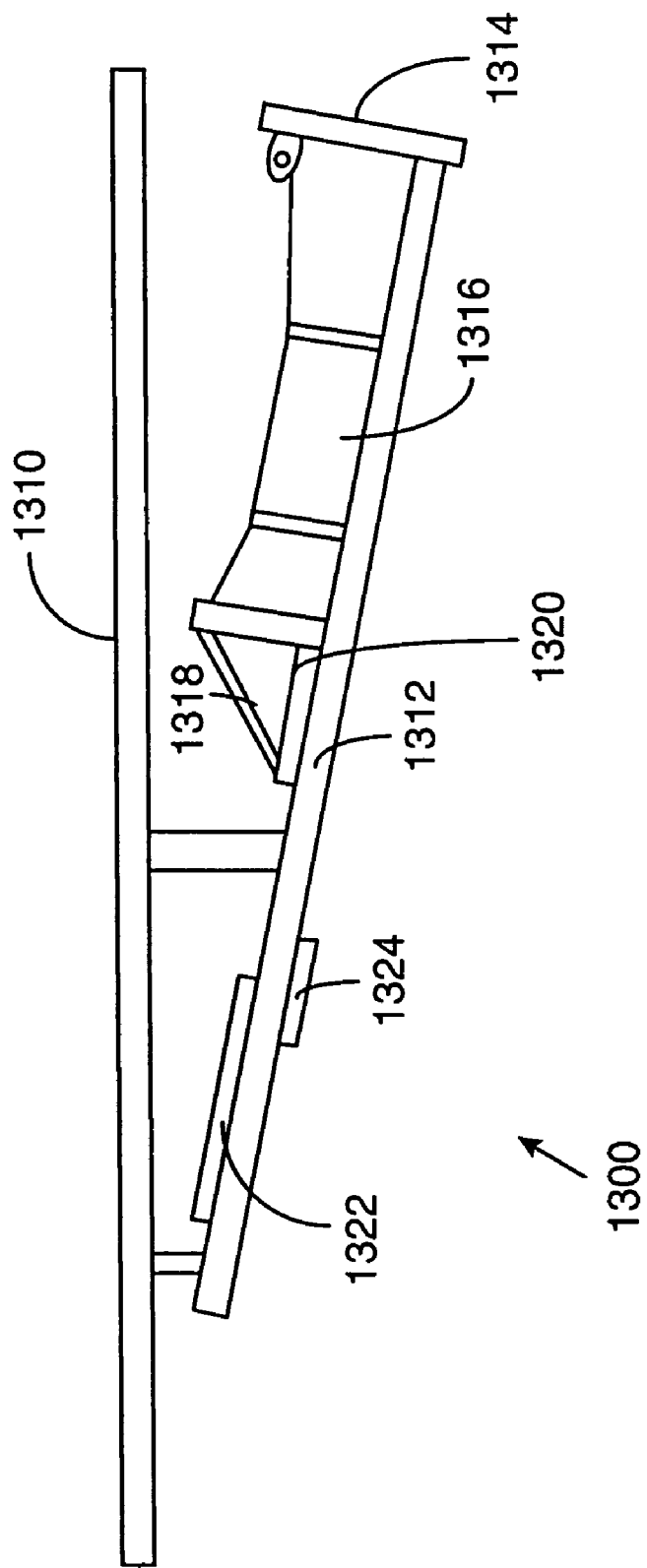
FIG. 13b is a side view of the internal component layout of the system of FIG. 13a illustrating the use of an adjustable lens assembly.

FIGS. 13a and 13b illustrate an image capture system 1300 having terminal unit and image capture components located within in a single housing 1302 and having an image capture window 1306 located on a front portion of the housing and at an angle with respect to the housing 1302. The system 1300 includes a display 1304 and keyboard for user interface and captures images consistent with those system configurations previously discussed. The system 1300 may capture either coded images or photo images depending upon the application.

With particular reference to FIG. 13b, the system optics mount upon a printed circuit board 1322 that firmly connects to a system board 1310 that firmly connects to the case 1302. System optics include a first lens system opening 1314, adjustable optics 1316, mirror 1318, and photo-detector 1320. Light reflected from a target is received through the first lens system opening 1314, focused by the adjustable optics 1316, reflected from the mirror 1318 and directed onto the photo-detector 1320. Electronics 1322 and 1324 operate to receive the captured image from the photo-detector, store the image, process the image and transfer the image as directed. The optics of the system 1300 adjust so that both coded images and photo images may be captured and processed.

Figure 14A:
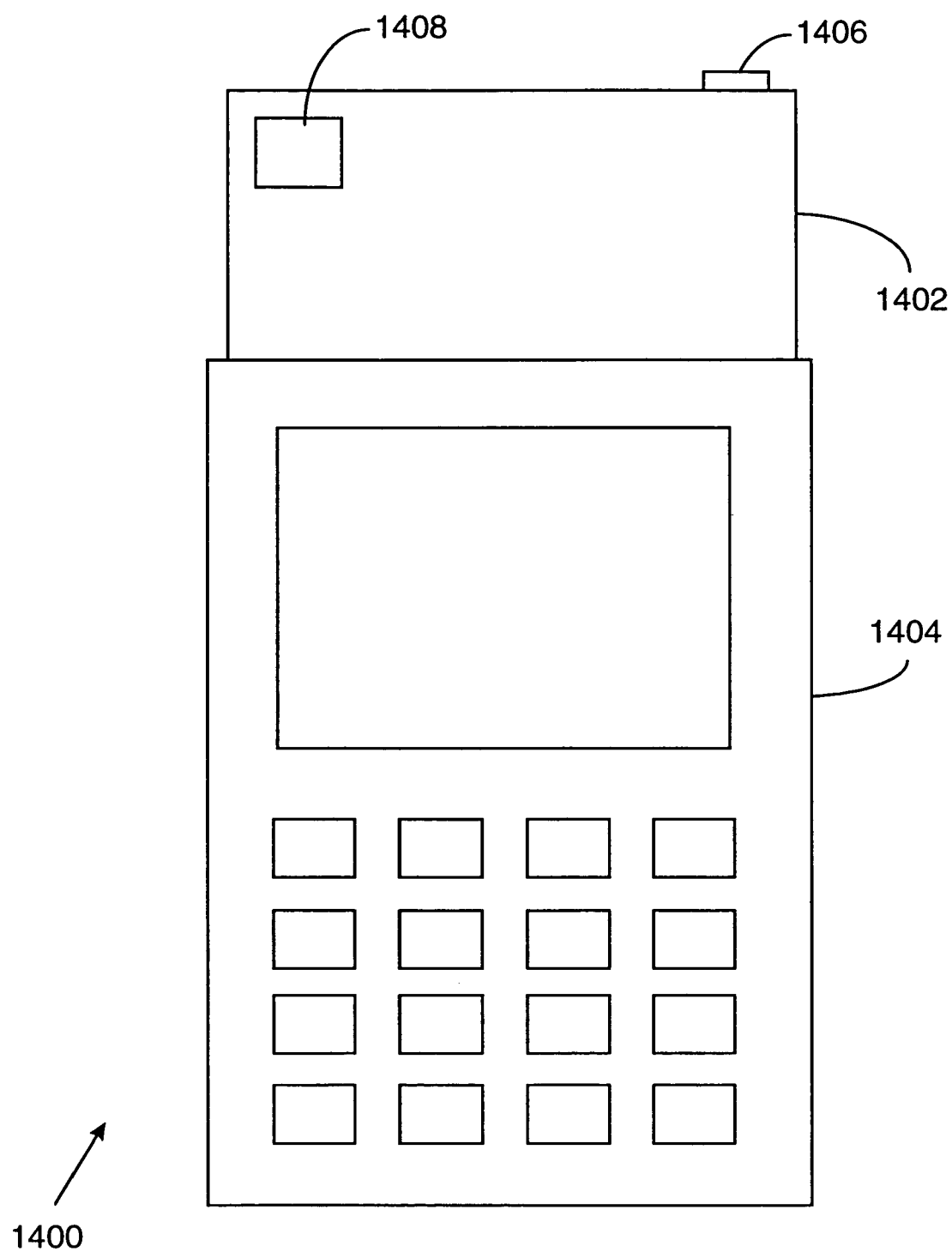
FIG. 14a is a back view of an image capture system that captures images only in a vertical orientation when either attached or unattached to a terminal unit.

FIG. 14a illustrates an image capture system 1400 operable only in a vertical orientation to capture images. The image capture system 1400 includes an image capture module 1402 and a terminal unit 1404. The terminal unit 1400 may comprise a data terminal as illustrated or another type of portable computing device. The image capture module 1402 includes a viewfinder 1408 and an image capture button depressable by a user to capture an image. The image capture system 1400, as opposed to some of the systems discussed previously, cannot capture images in a horizontal orientation. This system 1400 may be configured to capture only photo images. In the photo image only configuration, a reduced number of components are required and the system may be manufactured at a low cost.

Figure 14B:
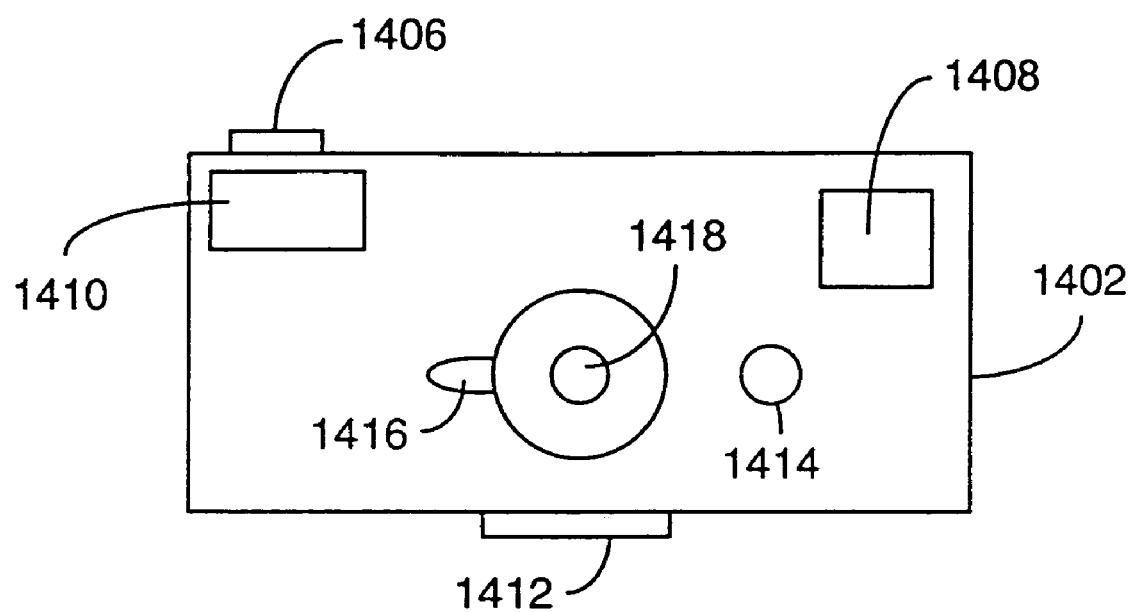
FIG. 14b is a front view of an image capture module of the system of FIG. 14a separated from the terminal unit illustrating an illumination unit, an optical, opening, a view finder and controls for adjusting the optical system and photo-detector array.

FIG. 14b illustrates the image capture module 1402 of FIG. 14a apart from the terminal unit 1404. As with prior configurations, the image capture module 1402 operates apart from the terminal unit 1404 to capture images, temporarily store the images and later transfer the images to a terminal unit 1404 via an interface 1412. The image capture module includes a built in illuminator 1410 for illuminating targets during image capture cycles. Optical opening 1418 receives reflected light and provides the reflected light to a photo-detector located within the module 1402. The module also includes an adjusting control 1414 that adjusts the operation of the photo-detector and aperture control 1416. These controls adjust the optics of the module 1402 so that satisfactory images may be captured in varying operating conditions.

Figure 15:
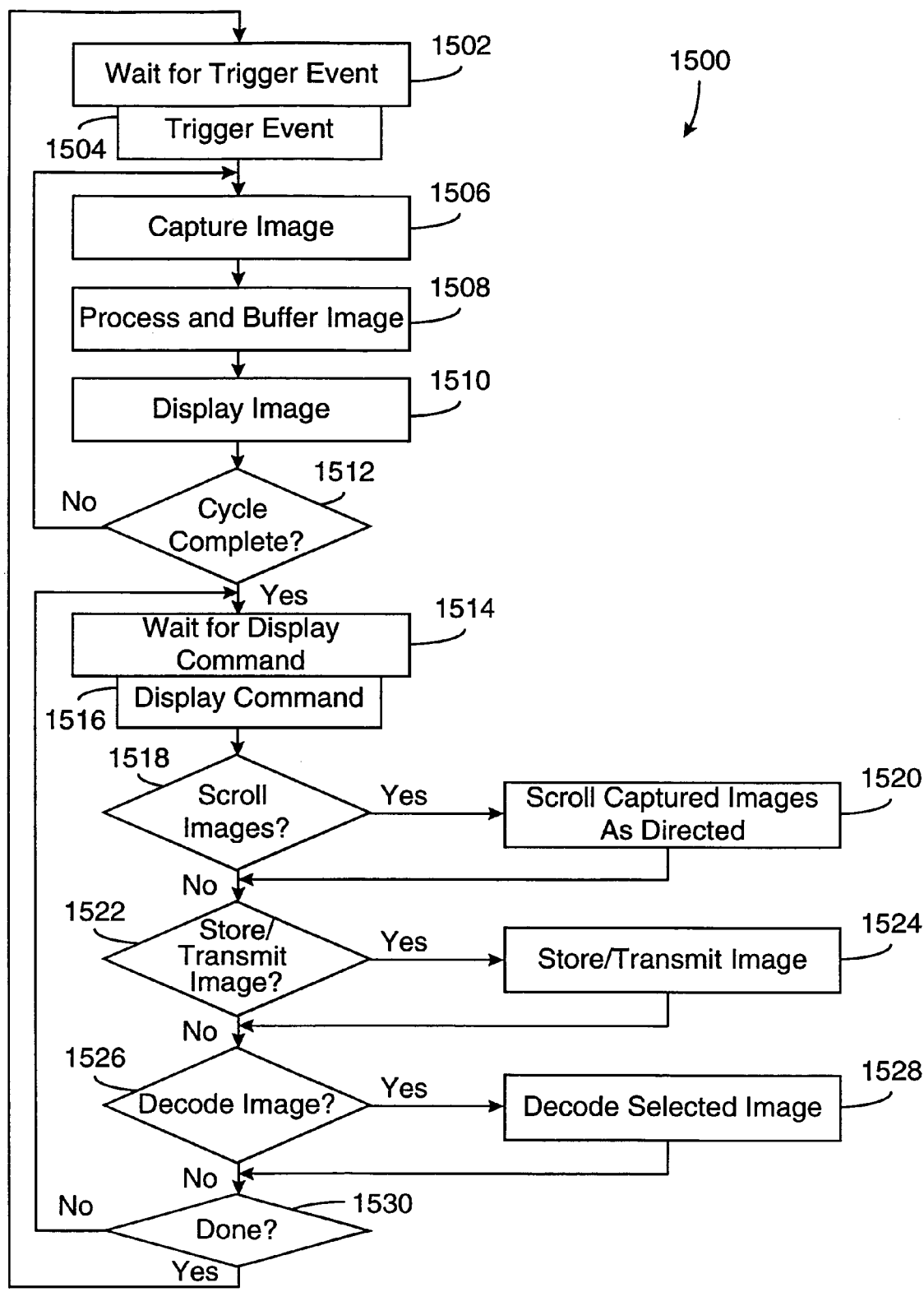
FIG. 15 is a flow diagram illustrating operation of the image capture system of the present invention during image capture, scrolling review of images and image selection for permanent retention and decoding.

FIG. 15 illustrates operation 1500 of an image capture system of the present invention in capturing images, displaying the images and allowing a user to operate on the images based upon user input. The system waits for a trigger event 1502 until a trigger event 1504 is received. Once the trigger event is received 1504, the system captures an image 1506. The captured image may be a coded image or a photo image. Once captured, the system processes and buffers the image 1508. Buffering may be done by storing the captured image in main memory or in an image buffer dedicated to the short term storage of captured images. The system then displays the image 1510 and determines whether the capture cycle is complete 1512. If the capture cycle is not complete, the system captures another image 1506 and continues capturing images until the capture cycle is complete. In one type of capture cycle mode a single image is captured upon initiation. However, in other capture cycle modes, multiple images are captured, perhaps until a capture button is released, until a certain number of images are captured or until storage dedicated for storing images is filled.

Once the capture cycle is complete, the system waits for a display command from a user 1514. While waiting for a display command, the system displays a most recently captured images. Once the display command is received, the system determines what type of command is received and proceeds accordingly. If the command requests an image scroll 1518, the system scrolls the captured images as directed 1520. An image scroll includes displaying a previously captured image, a subsequently captured image or a particular captured image. If the command requests the storage, transmission or deletion of one or more of the captured images 1522, the system stores, transmits or deletes the image or images depending upon the command. At the direction of the user, undesirable images could be purged from those images captured, certain of the images could be selected to be permanently retained and/or one or more of the images could be transmitted from the system to a remote location via a wireless or wired link.

For example, when the system is used in a service business, a field technician could capture photo images of equipment to be serviced, select one or more of the captured images for transmission and transmit the selected images to a central location. Similarly, when the system is used in a product delivery and sales application, the system may be used to capture images of shelf space and to transfer the images to a central location. However, because not all captured images will likely be satisfactory for transmission, the user of the system may parse through captured images, select one or more of the captured images and transmit the selected captured images only.

When the display command is a decode command 1526, the system decodes the selected image 1528. At the selection of this command the system may first determine whether coded targets exist within a currently displayed captured images. If one or more of the coded targets are identified, the system highlights or outlines the images. The user is then prompted to select one or more of the coded images for decode. Upon selection of these coded images, the system then performs the requested decode and returns the decode results to the user. Alternatively, the system could deliver the results to the user and also deliver the results to another location via a wireless or wired link. When the system is used in a parcel delivery business, a user of the system could capture images of each of a large number of packages, parse the images, selectively decode the images and transmit some or all of the results to a central location.

The above description of the image capture system and the operation of the system is intended to illustrate the principles of the invention, but not to limit the scope of the invention. Various other embodiments and modifications to these preferred embodiments may be made by those skilled in the art without departing from the scope of the following claims.

We claim:

1. An image capture system comprising:
    a portable reader subsystem operable to capture image information;
    said portable reader subsystem being operable in a first mode to read coded image information and operable in a second mode to capture photo image information;
    a controller subsystem controlling the operation of the portable reader subsystem to capture coded image information and photo image information; and
    a light-energy sensor component, positioned to receive targeted coded image information and photo image information;
    wherein the portable reader subsystem has a first optical path for capture of coded images, a second optical path for capture of photo images, and wherein both optical paths lead to said light-energy sensor component.

2. The image capture system of claim 1, wherein the first optical path has a fixed focal length.

3. The image capture system of claim 1, wherein the first optical path has an adjustable aperture.

4. The image capture system of claim 3, where the adjustable aperture adjusts the depth of field of the first optical path.

5. The image capture system of claim 1, wherein the second optical path has a wider angle of view than said first optical path.

6. The image capture system of claim 1, wherein the second optical path has a deeper field of view than said first optical path.

7. The image capture system of claim 1, wherein the first and second optical paths have respective first and second shutters.

8. The image capture system of claim 1, wherein an illumination source is operable to direct illuminating light along the first optical path so as to illuminate a target.

9. The image capture system of claim 8, wherein the illumination source is operable to direct illumination along the second optical path during capture of photo image information.

10. The image capture system of claim 1, wherein the portable reader subsystem is in the same orientation during reading of coded image information and photo image information.

11. The image capture system of claim 1, where the portable reader subsystem comprises an image capture module.

12. The image capture system of claim 11, further comprising a user supported terminal subsystem for mounting the image capture module.

13. The image capture system of claim 1, said portable reader subsystem having a photo reader with a field of view directed along one axis, and having a code reader with a field of view directed along said one axis.

14. The image capture system of claim 1, said portable reader subsystem comprising a housing with plural sides, said housing, having a photo reader with a field of view extending from one side of the housing, and having a code reader with a field of view extending from said one side of the housing.

15. The image capture system of claim 14, said housing having a display at a side of the housing opposite said one side.

16. The image capture system of claim 15, said display displaying at least a part of the field of view of the photo reader.

17. The image capture system of claim 1, said portable reader system having a photo reader with a field of view directed along one axis, and having a code reader with a field of view directed along a different axis.

18. The image capture system of claim 17, wherein the one axis of the photo reader and the different axis of the code reader are orthogonally related.

19. The image capture system of claim 17, wherein at least a portion of the optical path of the photo reader and a portion of the optical path of the code reader are generally parallel.

20. The image capture system of claim 1, said portable reader subsystem comprising a housing with plural sides, said housing having a photo reader with a field of view extending from one side of the housing, and having a code reader with a field of view extending from another side of the housing.

21. The image capture system of claim 20, said housing having a display at a side of the housing opposite said one side.

22. The image capture system of claim 21, with at least a part of said display displaying the field of view of the photo reader.

23. The image capture system of claim 1, wherein the portable reader subsystem comprises a laser scanning device.

24. The image capture system of claim 23, wherein the laser scanning device is a two-dimensional laser scanning device.

25. The image capture system of claim 1, wherein the portable reader subsystem is operable in a single orientation to read coded image information and photo image information.

26. The image capture system of claim 1, wherein the portable reader subsystem comprises a terminal with a reader module.

27. The image capture system of claim 26, wherein the reader module is readily removable.

28. The image capture system of claim 27, wherein the reader module has a connector for ready operative coupling with the terminal.

29. The image capture system of claim 28, wherein the terminal has a display for displaying images captured by the reader module when the reader module is coupled with the terminal.

30. The image capture system of claim 27, wherein the reader module is operative to capture images when removed from the terminal.

\* \* \* \* \*